(12) United States Patent
Paduano et al.

(10) Patent No.: US 9,540,101 B2
(45) Date of Patent: Jan. 10, 2017

(54) SYSTEM, APPARATUS AND METHOD FOR LONG ENDURANCE VERTICAL TAKEOFF AND LANDING VEHICLE

(71) Applicant: Aurora Flight Sciences Corporation, Manassas, VA (US)

(72) Inventors: James Donald Paduano, Boston, MA (US); Paul Nils Dahlstrand, Newton, MA (US); John Brooke Wissler, Waltham, MA (US); Adam Woodworth, Melrose, MA (US)

(73) Assignee: Aurora Flight Sciences Corporation, Manassas, VA (US)

( * ) Notice: Subject to any disclaimer, the term of this patent is extended or adjusted under 35 U.S.C. 154(b) by 0 days.

(21) Appl. No.: 14/507,198

(22) Filed: Oct. 6, 2014

(65) Prior Publication Data

US 2015/0336666 A1 Nov. 26, 2015

Related U.S. Application Data

(62) Division of application No. 13/397,569, filed on Feb. 15, 2012, now abandoned.

(51) Int. Cl.
*B64C 27/52* (2006.01)
*B64C 29/04* (2006.01)
(Continued)

(52) U.S. Cl.
CPC .............. *B64C 27/52* (2013.01); *B64C 3/42* (2013.01); *B64C 5/02* (2013.01); *B64C 9/00* (2013.01);
(Continued)

(58) Field of Classification Search
CPC .. B64C 25/001; B64C 2025/006; B64C 29/04; B64C 29/02; B64C 2025/008; B64C 2201/18; B64C 2201/024; B64C 2201/088; B64C 27/26; B64C 27/22; B64C 27/28; B64C 29/0033; B64C 29/0025; B64C 29/0091; B64C 29/0016; B64C 29/0008
See application file for complete search history.

(56) References Cited

U.S. PATENT DOCUMENTS 1,875,267 A 8/1932 Savoja
2,095,734 A * 10/1937 Dornier .......................... 416/24
(Continued)

FOREIGN PATENT DOCUMENTS

IL 140421 11/2003
WO 2010137016 12/2010

OTHER PUBLICATIONS

Aerovel Corporation—Developers of Miniature Robotic Aircraft retrieved from <http://www.aerovelco.com/> on Jan. 26, 2012.
(Continued)

*Primary Examiner* — Brian M O'Hara
*Assistant Examiner* — Michael Kreiner
(74) *Attorney, Agent, or Firm* — Michael Stanley Tomsa; McAndrews, Held & Malloy, Ltd.

(57) ABSTRACT

A vertical take-off and landing (VTOL) aircraft according to an aspect of the present invention comprises a fuselage, an empennage having an all-moving horizontal stabilizer located at a tail end of the fuselage, a wing having the fuselage positioned approximately halfway between the distal ends of the wing, wherein the wing is configured to transform between a substantially straight wing configuration and a canted wing configuration using a canted hinge located on each side of the fuselage. The VTOL aircraft may further includes one or more retractable pogo supports, wherein a retractable pogo support is configured to deploy from each of the wing's distal ends.

22 Claims, 15 Drawing Sheets

(51) Int. Cl.
  *B64C 29/02* (2006.01)
  *B64C 39/02* (2006.01)
  *B64C 29/00* (2006.01)
  *B64C 3/42* (2006.01)
  *B64C 5/02* (2006.01)
  *B64C 9/00* (2006.01)
  *B64C 25/10* (2006.01)
  *B64D 27/02* (2006.01)
  *B64D 43/00* (2006.01)

(52) U.S. Cl.
  CPC ............... *B64C 25/10* (2013.01); *B64C 29/00* (2013.01); *B64C 29/0033* (2013.01); *B64C 29/0091* (2013.01); *B64C 29/02* (2013.01); *B64C 29/04* (2013.01); *B64C 39/024* (2013.01); *B64D 27/02* (2013.01); *B64D 43/00* (2013.01); *B64C 2201/021* (2013.01); *B64C 2201/088* (2013.01); *B64C 2201/102* (2013.01); *B64C 2201/108* (2013.01); *B64C 2201/162* (2013.01); *B64C 2201/187* (2013.01)

(56) References Cited

U.S. PATENT DOCUMENTS

| | | | | |
|---|---|---|---|---|
| 2,481,379 | A | * | 9/1949 | Zimmerman .................. 244/7 B |
| 2,575,647 | A | * | 11/1951 | Winslow .................... 244/102 R |
| 2,578,578 | A | * | 12/1951 | Myers ........................ 244/102 R |
| 2,622,826 | A | * | 12/1952 | Prince ........................... 244/7 B |
| 2,668,026 | A | * | 2/1954 | Price ................................. 244/52 |
| 2,678,783 | A | * | 5/1954 | Myers ............................ 244/7 B |
| 2,712,420 | A | * | 7/1955 | Amster et al. ................ 244/7 B |
| 2,825,514 | A | | 3/1958 | Focke |
| 2,837,302 | A | * | 6/1958 | Pirrone ............................ 244/49 |
| 2,868,477 | A | * | 1/1959 | Chaplin ....................... 244/12.1 |
| 2,881,989 | A | | 4/1959 | Flettner |
| 2,929,580 | A | | 3/1960 | Ciolkosz |
| 2,994,492 | A | * | 8/1961 | Dobson et al. ................ 244/7 R |
| 3,096,952 | A | * | 7/1963 | Roppel ........................ 244/12.4 |
| 3,149,800 | A | | 9/1964 | Sintes et al. |
| 3,326,498 | A | * | 6/1967 | Corning ....................... 244/12.4 |
| 3,366,347 | A | | 1/1968 | Soulez-Lariviere |
| 3,410,506 | A | | 11/1968 | Hayes |
| 3,426,982 | A | * | 2/1969 | Markwood ................... 244/7 C |
| 3,559,921 | A | | 2/1971 | Timperman |
| 3,582,021 | A | | 6/1971 | Pender |
| 4,457,479 | A | | 7/1984 | Daude |
| 5,056,737 | A | * | 10/1991 | Taylor ............................ 244/7 B |
| 5,086,993 | A | | 2/1992 | Wainfan |
| 5,289,994 | A | | 3/1994 | Del Campo Aguilera |
| 5,381,985 | A | * | 1/1995 | Wechsler et al. ............. 244/7 C |
| 5,395,073 | A | * | 3/1995 | Rutan et al. ..................... 244/48 |
| 5,758,844 | A | | 6/1998 | Cummings |
| 5,765,777 | A | * | 6/1998 | Schmittle ......................... 244/48 |
| 5,765,783 | A | | 6/1998 | Albion |
| 5,769,359 | A | * | 6/1998 | Rutan et al. ................. 244/76 R |
| 5,839,691 | A | | 11/1998 | Lariviere |
| 5,863,013 | A | * | 1/1999 | Schmittle ......................... 244/48 |
| 5,865,399 | A | * | 2/1999 | Carter, Jr. ........................ 244/54 |
| 5,941,478 | A | * | 8/1999 | Schmittle ......................... 244/48 |
| RE36,487 | E | | 1/2000 | Wainfan |
| 6,655,631 | B2 | * | 12/2003 | Austen-Brown ............ 244/12.4 |
| 7,070,145 | B2 | | 7/2006 | Baldwin |
| 7,137,589 | B2 | | 11/2006 | Arata |
| 7,267,300 | B2 | | 9/2007 | Heath et al. |
| 7,520,466 | B2 | | 4/2009 | Bostan |
| 7,731,125 | B2 | * | 6/2010 | Karem ....................... 244/114 R |
| 7,874,513 | B1 | * | 1/2011 | Smith ............................ 244/12.4 |
| 7,997,526 | B2 | * | 8/2011 | Greenley ....................... 244/7 B |
| 8,434,710 | B2 | * | 5/2013 | Hothi et al. ................... 244/7 B |
| 2003/0094537 | A1 | | 5/2003 | Austen-Brown |
| 2005/0133662 | A1 | | 6/2005 | Magre |
| 2006/0226281 | A1 | | 10/2006 | Walton |
| 2007/0018035 | A1 | | 1/2007 | Saiz et al. |
| 2007/0114325 | A1 | | 5/2007 | Baldwin |
| 2008/0223994 | A1 | | 9/2008 | Greenley |
| 2009/0121074 | A1 | | 5/2009 | Vaneck et al. |
| 2010/0012790 | A1 | | 1/2010 | Bostan |
| 2010/0078526 | A1 | | 4/2010 | Mulero Valenzuela |
| 2010/0120321 | A1 | | 5/2010 | Rehkemper et al. |
| 2010/0213309 | A1 | | 8/2010 | Parks |
| 2010/0243821 | A1 | | 9/2010 | Lim |
| 2011/0001001 | A1 | | 1/2011 | Bryant |
| 2011/0036955 | A1 | | 2/2011 | Karem |
| 2011/0042508 | A1 | | 2/2011 | Bevirt |
| 2012/0091257 | A1 | | 4/2012 | Wolff et al. |
| 2012/0248259 | A1 | | 10/2012 | Page et al. |
| 2015/0028151 | A1 | | 1/2015 | Bevirt et al. |

OTHER PUBLICATIONS

Aerovel Corporation—Flexrotor—Tabletop sized Robotic Long Range Aircraft retrieved from <http://www.aerovelco.com/Flexrotor.html> on Jan. 26, 2012.
Air-Data Applications: Engineering Flow-Management Solutions from Aeroprobe.
Stephen Trimble, Boeing looks ahead to a 'V-23' Osprey, from The DEW Line, "Distant Early Warning" for the global defense industry, Jun. 22, 2009, retrieved from <http://www.flightglobal.com/blogs/the-dewline/2009/06/boeing-looks-ahead-to-a-v-23-o/>.
3 I/O slot Power DNA Cube, Advance-Tech: The Technology Group, retrieved from <http://www.advancetech.in/ourbusiness/details/857/369/mil-aero-&-defence> on Jan. 26, 2012.
ISR Data Links—EnerLinksIII™—Secure LOS Data Links to the Horizon, retrieved from <http://www.viasat.com/government-communications/isr-data-links/enerlinks> on Jan. 26, 2012.
Rack and pinion from Wikipedia, the free encyclopedia, retrieved from <http://en.wikipedia.org/wiki/Rack_and_pinion>, on Jan. 28, 2012.
Stabilator from Wikipedia, the free encyclopedia, retrieved from <http://en.wikipedia.org/wiki/Stabilator> on Jan. 28, 2012.
Sun and planet gear from Wikipedia, the free encyclopedia, retrieved from <http://en.wikipedia.org/wiki/Sun_and_planet_gear> on Jan. 28, 2012.
Tiltwing from Wikipedia, the free encyclopedia, retrieved from <http://en.wikipedia.org/wiki/Tiltwing> on Jan. 28, 2012.
William W. Bierbaum, "UAVs", Air & Space Power Journal—Chronicles Online Journal.
The MLB V Bat Brochure, copyright 2011, retrieved from <http://spyplanes.com/products-v-bat/> on Jan. 25, 2012.
VCS-4586: Unmanning the future, retrieved from <http://www.cdlsystems.com/index.php/vcs4586> on Jan. 26, 2012.
Worm drive from Wikipedia, the free encyclopedia, retrieved from <http://en.wikipedia.org/wiki/Worm_drive> on Jan. 28, 2012.

* cited by examiner

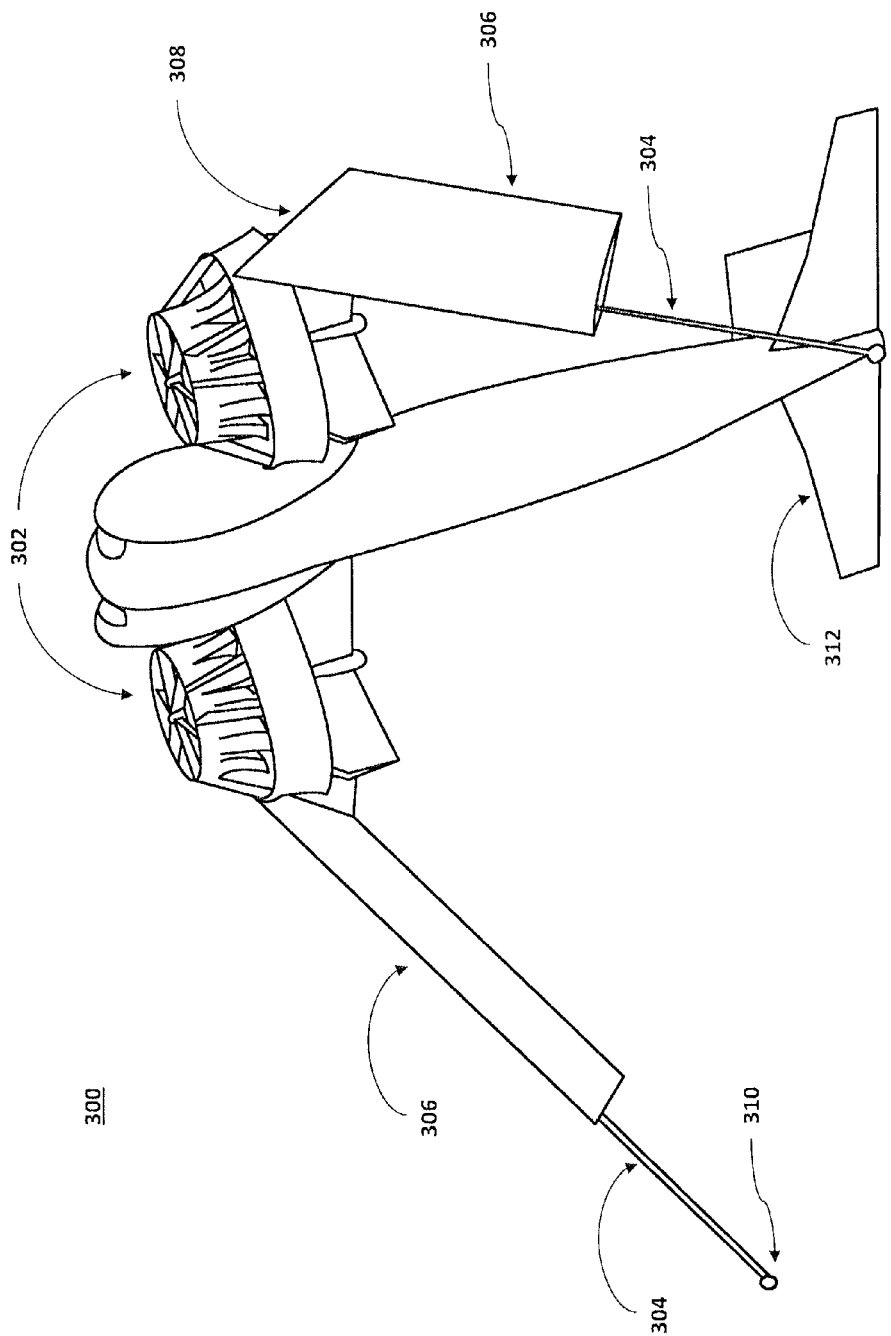

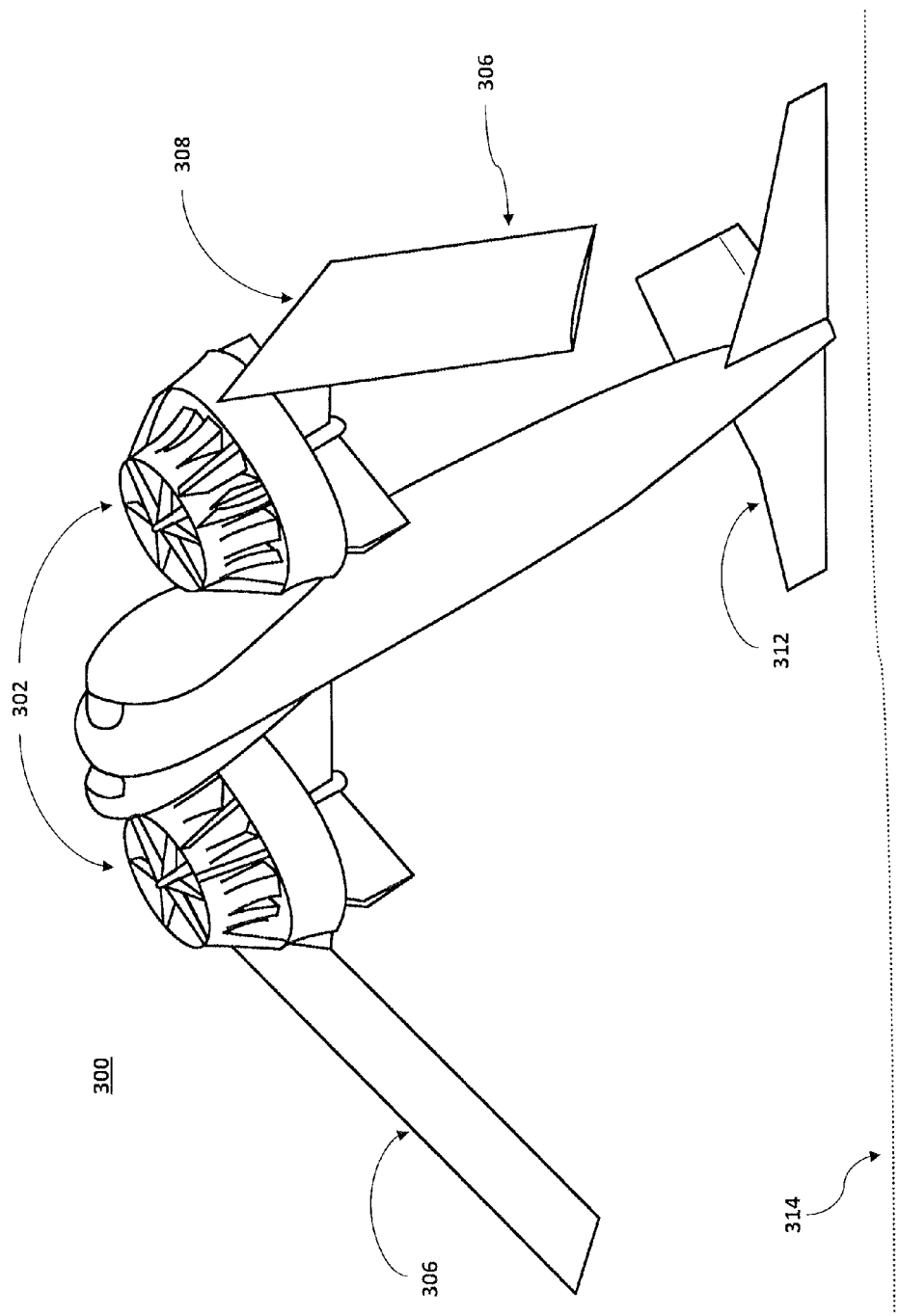

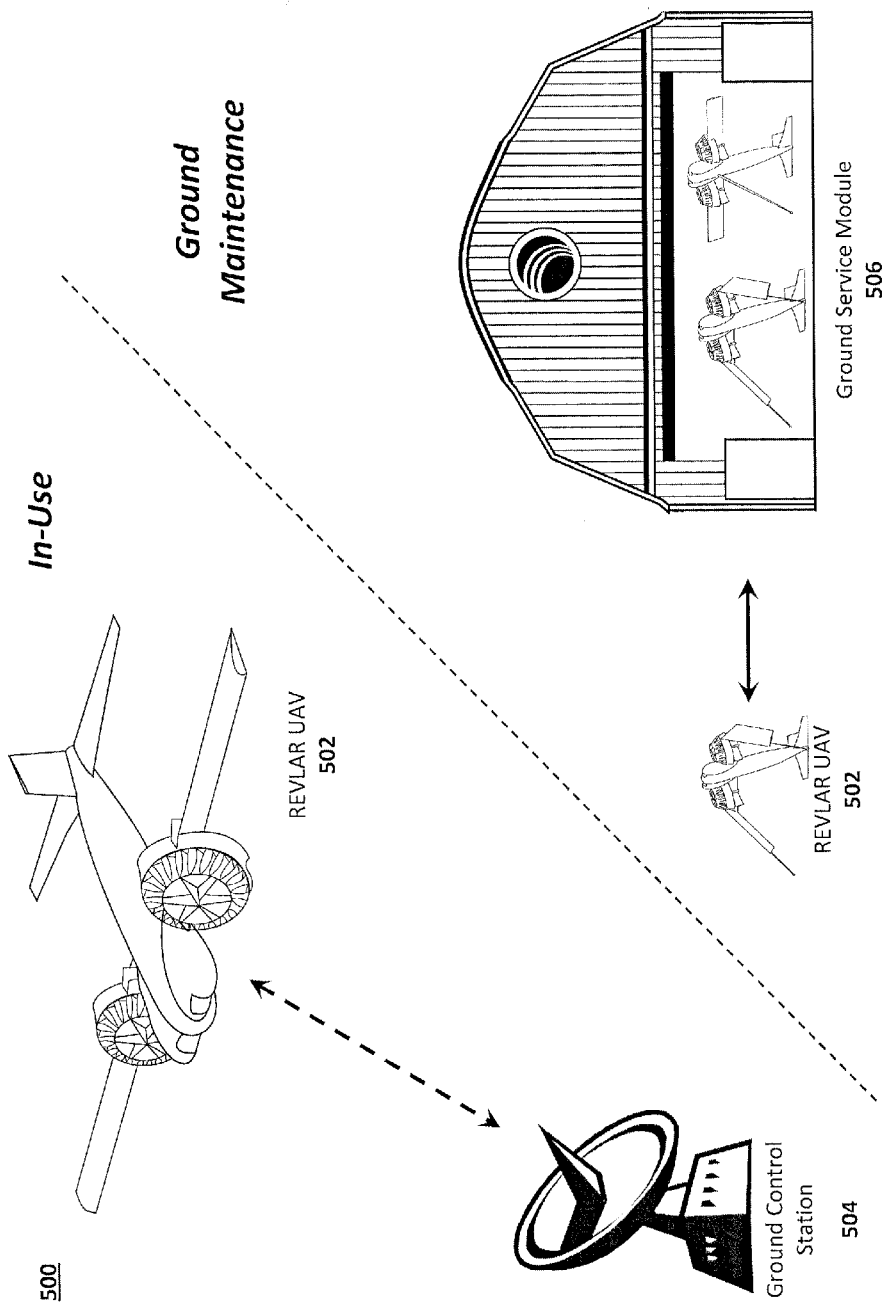

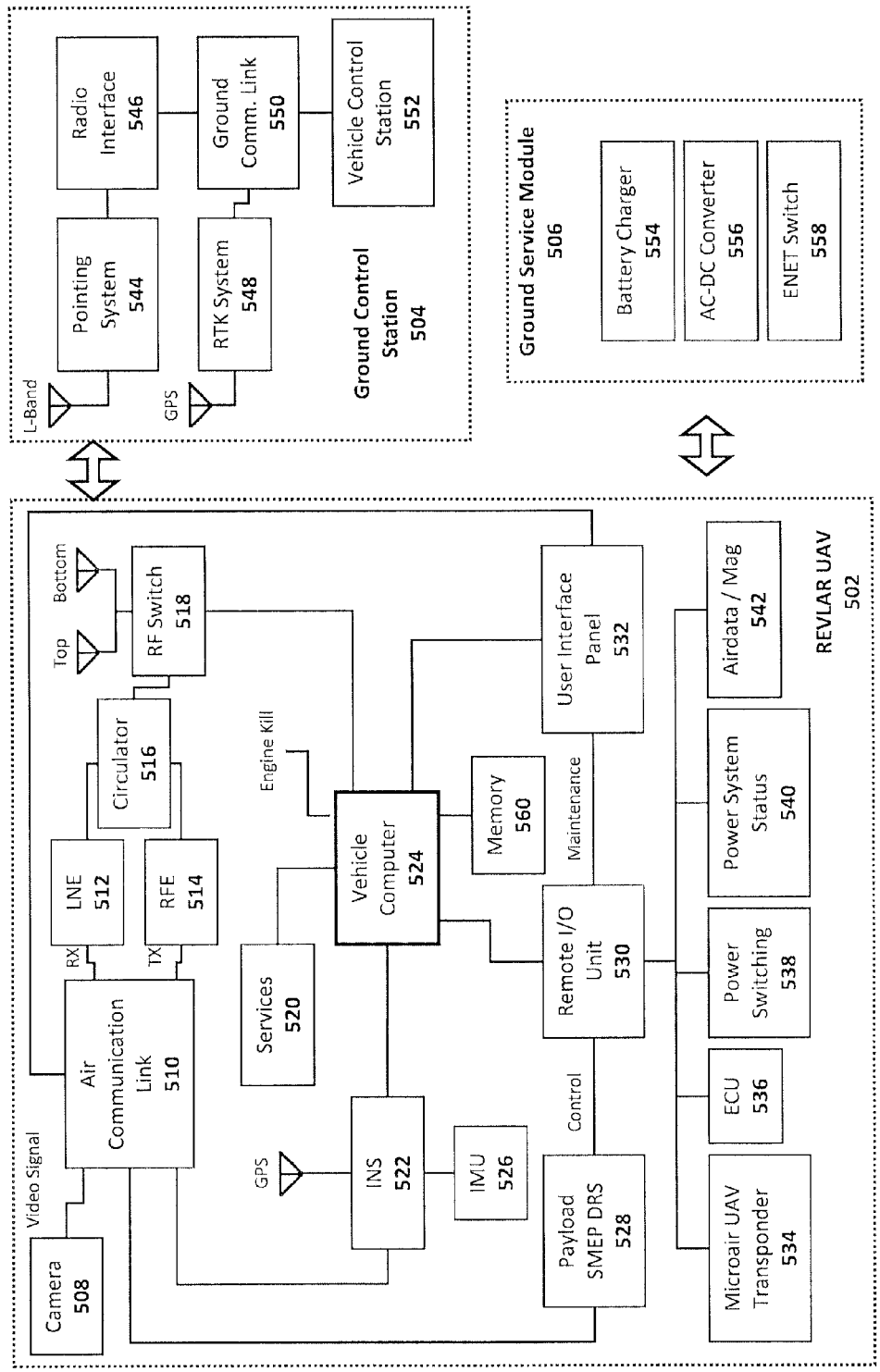

SYSTEM, APPARATUS AND METHOD FOR LONG ENDURANCE VERTICAL TAKEOFF AND LANDING VEHICLE

This application is a divisional of U.S. patent application Ser. No. 13/397,569, filed Feb. 15, 2012, the contents of which are incorporated herein by reference.

TECHNICAL FIELD

The present invention relates to system and methods for vertical takeoff and landing of a long-endurance Unmanned Aerial Vehicle ("UAV"). More specifically, the present invention relates to systems and methods for vertical takeoff and landing of long-endurance Tier 2 UAVs.

BACKGROUND INFORMATION

There has long been a need, exacerbated by today's overseas contingency operations, for vertical take-off and landing ("VTOL") vehicles that are capable of being deployed from confined spaces. In fact, many situations favor vehicles, specifically UAVs, that can launch and recover vertically without requiring complex or heavy ground support equipment. The ability to organically deploy a UAV is particularly attractive in situations such as forward-operating bases, clandestine locales, payload emplacement, and on-the-move situations. Until recently, however, the efficiency penalty associated with incorporating a hover phase of flight, the complexity associated with transition from vertical to horizontal flight, and the necessity to reduce or eliminate exposure of ground personnel to exposed high-speed rotors have hindered attempts to develop organically deployable VTOL UAVs, which are expected to be very important assets. Furthermore, the new competitive landscape for VTOL vehicles now requires long endurance, which can require flights in excess of 8 hours.

As a result, high aspect ratio (i.e., the ratio of a wing's length to its breadth) fixed-wing designs are gaining advantage over ducted designs and rotorcraft. An exemplary high aspect ratio fixed-wing design is the Flexrotor, which is available from Aerovel Corporation. The Flexrotor is described by Aerovel as a tabletop-sized robotic aircraft that offers a combination of long range and endurance, together with VTOL capabilities. For further information, see, for example, Aerovel Corporation's website at http://www.aerovelco.com/.

Despite prior attempts, the need exists for a system, method and apparatus that allows organic deployment and operation of long-endurance, high-aspect ratio VTOL UAVs from confined spaces.

SUMMARY

The present disclosure endeavors to provide a system, method and apparatus that allows organic deployment and operation of long-endurance, high-aspect ratio VTOL UAVs from confined spaces. Another objective of the present application is to provide a Tier 2-sized long-endurance Robust Efficient Vertical Launch and Recovery (REVLAR) UAV.

According to a first aspect of the present invention, a vertical take-off and landing (VTOL) aircraft comprises: a fuselage, wherein the fuselage has a nose end and a tail end; an empennage located at the tail end of the fuselage, wherein the empennage comprises a stabilizer configuration; two counter-rotating engines that are arranged such that one engine is mounted on the wing at each side of the fuselage; and a wing; wherein the fuselage is positioned approximately halfway between the distal ends of the wing; wherein the wing is configured to transform between a vertical configuration and a horizontal configuration using at least one pivotal connector positioned on each side of the fuselage; wherein, during a first phase of takeoff, the wing is in the vertical configuration thereby causing the nose end of the fuselage to lift off the ground while the tail end remains on the ground; wherein, during a second phase of takeoff, the wing transitions from the vertical configuration to the horizontal configuration until the fuselage achieves a predetermined stand-up angle; and wherein, during a third phase of takeoff, the wing is in the horizontal configuration and the aircraft is capable of wingborne flight.

According to a second aspect of the present invention, a vertical take-off and landing (VTOL) aircraft comprises: a fuselage, wherein the fuselage has a nose end and a tail end; an empennage located at the tail end of the fuselage, wherein the empennage comprises a stabilizer configuration; one or more engines; a wing; and a retractable pogo support; wherein the retractable pogo support is configured to deploy from the fuselage to form a tripod launch and recovery configuration with the empennage.

According to a third aspect of the present invention, a vertical take-off and landing (VTOL) aircraft comprises: a fuselage, wherein the fuselage has a nose end and a tail end; an empennage located at the tail end of the fuselage, wherein the empennage comprises a stabilizer configuration; one or more engines; a wing; wherein the fuselage is positioned approximately halfway between the distal ends of the wing; wherein the wing is configured to transform between a substantially straight wing configuration and a canted wing configuration using a canted hinge located on the wing at each side of the fuselage; and two or more retractable pogo supports; wherein a retractable pogo support is configured to deploy from each of the wing's distal ends.

In certain aspects, the aircraft may comprise two wing mounted counter-rotating engines, wherein the two counter-rotating engines are arranged such that one engine is mounted on each side of the fuselage. More specifically, at least one of the one or more engines may be positioned on each side of the fuselage at a point: (i) between the fuselage and the canted hinge; and/or (ii) between the pivotal connector and the distal ends of the wing;

In certain aspects, the wing may be configured such that, when in the canted wing configuration, the distal ends of the canted wing form a tripod launch and recovery configuration with the empennage.

In another aspects, the retractable pogo supports may be configured to deploy from the distal ends of the canted wings to form a tripod launch and recovery configuration with the empennage, such that the fuselage is positioned at a predetermined stand-up angle.

In yet another aspect, the wing may have a high aspect ratio and/or a payload for intelligence, surveillance, and reconnaissance.

In certain aspects, the predetermined stand-up angle may be between 45 and 90 degrees; more preferably between 60 and 80 degrees, and most preferably between 66 and 75 degrees.

BRIEF DESCRIPTION OF THE DRAWINGS

These and other advantages of the present invention will be readily understood with reference to the following specifications and attached drawings wherein:

FIG. 3a illustrates a front angular perspective of a second REVLAR UAV configuration on the ground;

FIG. 3b illustrates a front angular perspective of the second REVLAR UAV configuration in a first transitional phase;

FIG. 5a illustrates an exemplary avionics system diagram for controlling a REVLAR UAV; and FIG. 5b illustrates an exemplary component diagram of the avionics system diagram of FIG. 5a.

DETAILED DESCRIPTION

Figure 1A:
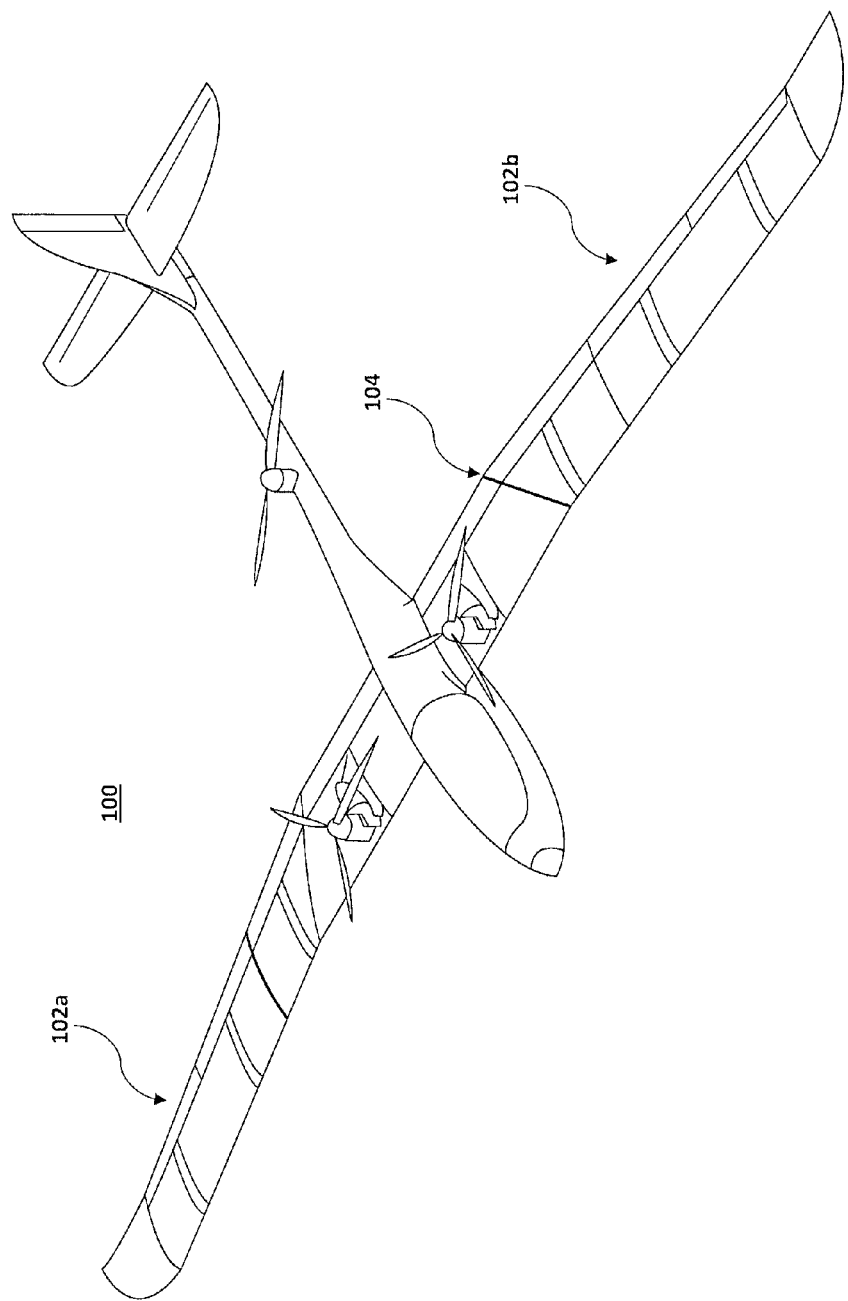
FIG. 1a illustrates an aircraft having canted hinges in a substantially straight wing configuration.

Embodiments of the present invention will be described hereinbelow with reference to the accompanying drawings. In the following description, well-known functions or constructions are not described in detail because they would obscure the invention in unnecessary detail. The present disclosure endeavors to provide a system, method and apparatus that allows organic deployment and operation of long-endurance, high aspect ratio VTOL UAVs from confined spaces.

An objective of the present application is to provide a tier 2-sized long-endurance Robust Efficient Vertical Launch and Recovery (REVLAR) UAV, a form of VTOL UAV. Additionally, the present application shall illustrate how a design may be scaled and shall identify exemplary size, weight, and endurance limits for a REVLAR UAV. Particular attention shall be paid to control strategies, especially in the VTOL mode, and associated transition to long-endurance flight. While the techniques and subject matter of the present disclosure may be described in relation to USAF Tier 2 UAVs, said techniques and subject matter may be readily applied to UAVs from the other USAF UAV tiers. For further information on the USAF tier system, see, for example, Major William W. Bierbaum's article entitled "UAV", available at http://www.airpower.maxwell.af.mil/airchronicles/cc/uay.html.

As will be discussed in greater detail below, employing one of more techniques disclosed in the present application enables operation and deployment, including launch and recovery of UAVs, from confined spaces. This ability greatly encourages organic deployment of UAVs, thereby eliminating the need for complex and cumbersome ground support. Organic deployment also eliminated the need for time that is typically wasted in setting up a UAV and preparing it for flight. Thus, the qualities of the presently disclosed REVLAR UAV systems are highly advantageous in the combat zone since minimal preparation and infrastructure are needed to facilitate UAV flight and control. For instance, locating a suitable runway for UAV deployment can be challenging, thus a UAV capable of achieving flight vertically, or within a minimal area, is often preferred when space is an issue. Moreover, organic UAV deployment can eliminate the need for a centralized command center. In other words, the REVLAR UAVs of the present application may be readily used and deployed by personnel in the field without requiring an advanced infrastructure. In fact, the REVLAR UAV may even be locally controlled via a handheld remote controller or mobile command center. Alternatively, the REVLAR UAV may be configured to be controlled from a greater distance using, for example, existing communication systems, such as, for example, L-Band, LAN, WLAN, cellular phone infrastructures, etc.

As will be discussed in greater detail below, in certain aspects, a REVLAR UAV may even employ (i) canted wings and/or (ii) tiltwing configurations. Canted wings may be accomplished by integrating a hinge or other joint within the wing, thereby permitting it to flex, curve, and/or pivot in the wind. Accordingly, canted hinges allow for a UAV to avoid dynamic transition by remaining trimmed at all flight conditions, from forward flight to hovering flight.

Canted wings may be used for a variety of purposes, including, for example, reducing the angle of attack of the wing when deflected due to gusts or other disturbances. A first exemplary wing is disclosed by commonly owned U.S. Patent Publication No. 2010/0213309, entitled Non-Planar Adaptive Wing Solar Aircraft, by Robert Parks (the "'309 Publication"). The '309 Publication discloses an aircraft having wings comprising one or more modular constituent wing panels. Each wing panel of the '309 Publication includes at least one hinge interface that is configured to rotationally interface with a complementary hinge interface on another wing panel.

Figure 1B:
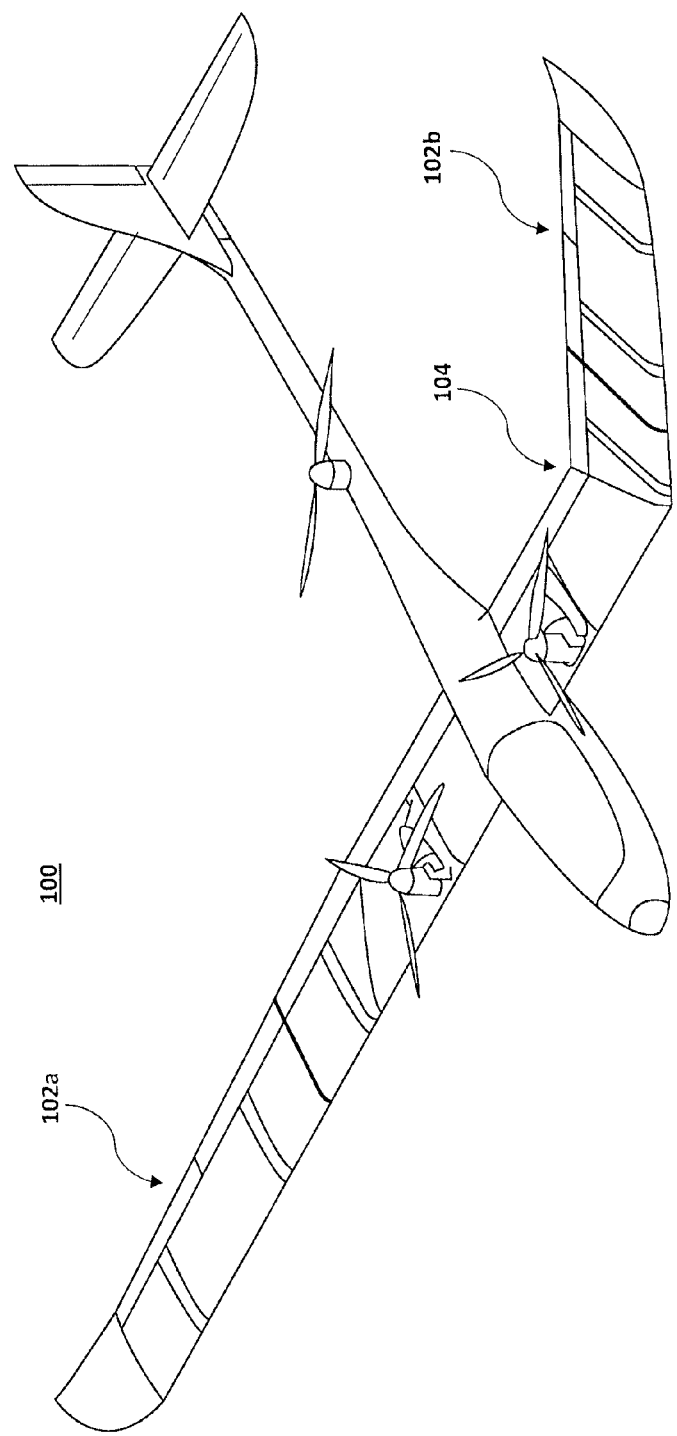
FIG. 1b illustrates the aircraft of FIG. 1a, wherein the port side wing has transitions to a canted wing configuration to deflect wind.

Another exemplary aircraft equipped with canted wing hinges is illustrated in FIGS. 1a and 1b. FIG. 1a illustrates an aircraft 100 with both wings 102a, 102b in their normal state (i.e., forming a substantially straight wing), without interference from, for example, a wind gust. FIG. 1b, on the other hand, illustrates the aircraft 100 of FIG. 1a with the port-side wing 102b flexing via the canted hinge to form a canted wing in response to, for example, a wind gust. Ignoring the thrust vectoring aspect of the design, as illustrated in FIG. 1b, the wing 102b, while in the canted wing configuration, effectively rejects gusts by maintaining constant moment at the canted hinge point 104, thus delivering constant lift to the aircraft 100 in the face of gusts.

As for the tiltwing configuration, a tiltwing aircraft typically features a wing that is horizontal for conventional forward flight and rotates up for vertical takeoff and landing. It is similar to a tiltrotor design where only the propeller and engine rotate. Tiltwing aircraft are often capable of VTOL operations. A tiltwing design offers certain advantages in vertical flight relative to a tiltrotor. Because the slipstream from the rotor strikes the wing on its smallest dimension, the tiltwing is able to apply more of its engine power to lifting the aircraft. For comparison, the V-22 Osprey tiltrotor loses about 10% of its thrust to interference from the wings. However, the fixed wing of a tiltrotor aircraft offers a superior angle of attack—thus more lift and a shorter takeoff roll—when performing STOL/STOVL operations. A drawback of the tiltwing is control during hover, because the wing tilted vertically represents a large surface area for crosswinds to push.

In designing a REVLAR UAV according to the various aspects of the present application, nominal target requirements include a 10 ft wingspan, 5 hour endurance, 70 lbs gross take-off weight, and 70 mph cruise speed. The REVLAR UAV should also be enabled to launch and/or recover within a cylindrical area having a 3 meter radius and at least 5 meters tall (i.e., 5 meters off the ground). For example, as the vehicle enters the landing area from about 5 meters off the ground, the REVLAR UAV should be configured to transition and land without breaching the cylindrical area. Likewise during take-off it must stay inside this cylinder until it reaches 5 meters. Moreover, the REVLAR UAV should be able to operate safely in a confined space around people under field conditions. Accordingly, there are several potential applications for such a REVLAR UAV, including, for example, equipping it with a sensor payload for intelligence, surveillance, and reconnaissance (ISR).

An exemplary VTOL UAV that appears to meet the above nominal target requirements is MLB Company's V-Bat ("V-Bat"). The V-Bat is a tail-sitter aircraft having a ducted fan in a pusher configuration powered by a gasoline engine. The V-Bat UAV has a wingspan of 10 feet, weighs 70 pounds, can fly for up to 5 hours, and is capable of launching and recovering in an area as small as 6×6 meters. For additional information on the V-Bat and its capabilities, see, for example, the MLB Company's website at http://spyplanes.com/products-v-bat/. As a result of the weight-and-balance of the tail-mounted engine, the V-Bat also has a high aspect ratio straight wing mounted far aft on the fuselage.

Additional advantages of the V-Bat include its low center of gravity, the fact that the rear-mounted duct has a good moment arm with respect to center of gravity to improve control power in hover, and potential benefits in drag due to duct ingestion of the fuselage boundary layer. On the other hand, while the size, weight, payload, and duration of the V-Bat make it a suitable VTOL UAV, the V-Bat still suffers from shortcomings that may be overcome by the teachings of the present application.

Accordingly, in developing a REVLAR UAV, a first objective is to improve the efficiency of the propulsion system and reduce the engine power and weight required for hover by introducing a ducted fan, for instance using a mixer-ejector to improve hover thrust, and using a modern efficient heavy fuel engine. A second objective is to implement configuration modifications that simplify and stabilize the transition between hover and wing-borne flight. Once airborne, the aircraft transitions the thrust aft until a forward airspeed sufficient to support the aircraft is reached, at which point the aircraft is wing-borne and conventional aerodynamics may take over.

Finally, a third objective is to employ full autonomy for takeoff and landing. For example, the REVLAR UAV may employ a system capable of landing the UAV, remaining on the ground for a set period, and launching again in winds without any human intervention. This may be accomplished by combining a configuration that does not require dynamic transition between hover and forward flight (that is, it has a stable trim across the velocity envelope) with full-envelope flight control laws and robust recovery procedures.

Exemplary REVLAR UAVs and configurations capable of accomplishing vertical takeoff or landing within a minimal area will now be described in greater detail. Said exemplary configurations include, for example: (i) resting the REVLAR UAV on a passively retractable pogo support; (ii) using canted hinges on the wing to allow the wing tips and tail to form a tripod support; and (iii) tiltwing configuration where the fuselage may be freely rotated from the wings and engines. While the term "wing" maybe be used throughout this application, the wing may be composed of one or more wing portions, thus, for the purposes of this application, two wing portions joined together by a fuselage or other components shall be considered a single wing.

Aspect ratio and planform (e.g., the shape and layout of a fixed-wing aircraft's fuselage and wing) can be used to predict the aerodynamic performance of a wing. As exemplified in Equation 1, the aspect ratio (AR) is defined as the square of the wingspan b divided by the area S of the wing planform—this is equal to the length-to-breadth ratio for constant breadth. For each of the following REVLAR UAVs, it is preferable to utilize a wing having a high aspect ratio, thus a high AR value. Accordingly, it may be preferable to employ a wing having a high AR value of, for example, at least 10 or, more preferably, at least 15.

$$AR = \left(\frac{b^2}{S}\right) \qquad \text{Equation 1}$$

Figure 2A:
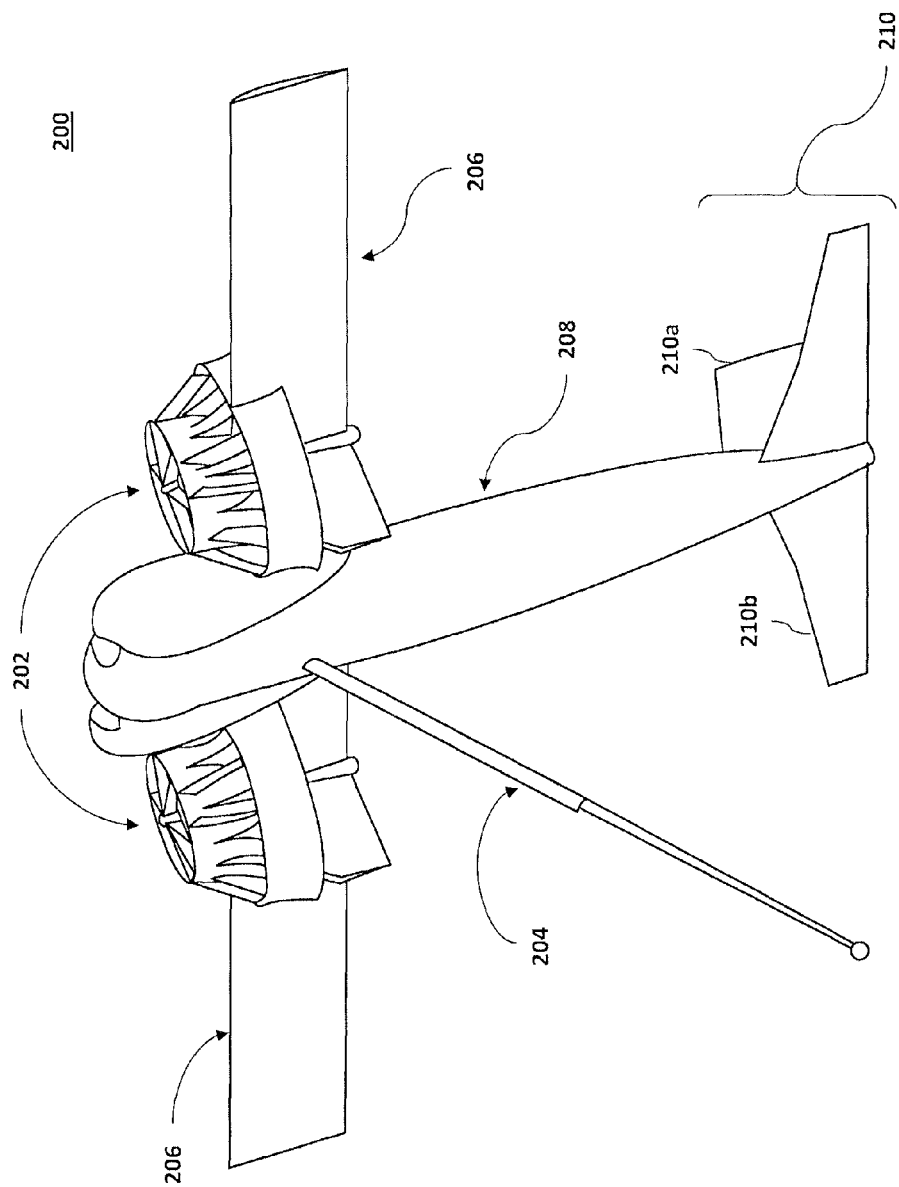
FIG. 2a illustrates a front angular perspective of a first REVLAR UAV configuration.
Figure 2B:
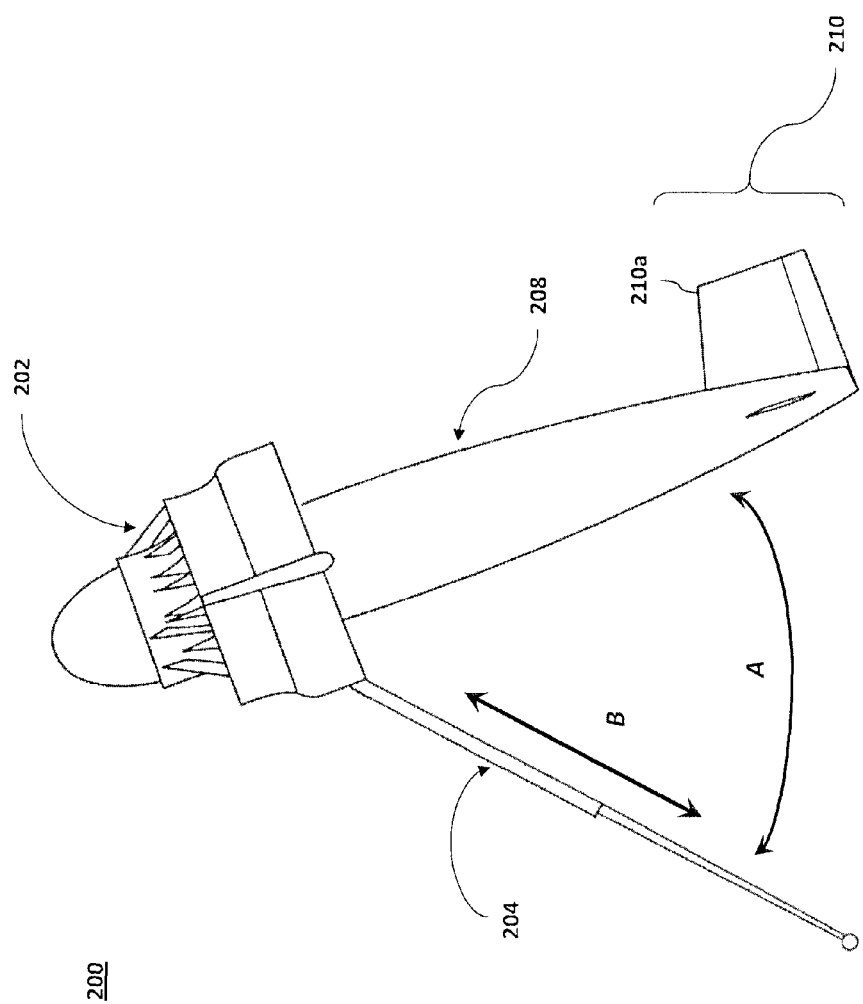
FIG. 2b illustrates a side perspective of the first REVLAR UAV configuration.

Turning now to FIGS. 2a and 2b, the first REVLAR configuration involves minimal risk while satisfying each of the above objectives. The REVLAR UAV 200 is illustrated resting on a passively retractable pogo support 204. Depending on the design needs of the aircraft, the pogo support may be of a fixed length or telescopic (e.g., in direction B)—as illustrated in FIGS. 2a and 2b. While the REVLAR UAV 200 of FIGS. 2a and 2b may be appear similar to a traditional UAV having a fixed wing 206 and engines 200, the REVLAR UAV's 200 design and aerodynamics allows the aircraft to have reduced trim drag in cruise. For example, the UAV 200 may comprise one or more inlets for reducing trim drag.

Furthermore, using the pogo support 204, the REVLAR UAV 200 may be angled toward the sky using a predetermined stand-up angle, thereby eliminating the need for a runway. In fact, due to the REVLAR UAV's 200 stand-up angle (e.g., launch angle), which, as discussed below, may be calculated as taught by FIG. 2c and Equation 2, the launch configuration may be referred to as an efficient tripod launch and recovery configuration. This configuration also facilitated increased stability at all velocities from zero to cruise (e.g., wingborne).

To provide thrust, the REVLAR UAV 200 may be equipped with, for example, twin counter-rotating engines 202. Specifically, REVLAR UAV 200 may utilize twin ducted fans 202 (e.g., shrouded mixer-ejector fans) mounted on either side of the fuselage 208, bringing the center of gravity forward and allowing the incorporation of a empennage (i.e., tail assembly) for reducing trim drag during cruise and hover. For a vehicle with a gross take-off weight of 70 lbs, for instance, The propulsion system could comprise a FloDesign Inc. Fan and Mixer-Ejector combination, driven by an XRD Inc. 12 hp heavy fuel engine. Similar systems have been demonstrated to be quiet (propeller noise reduction of 15-20 dB) and reduce engine take-off power by approximately 30%. This is particularly important for VTOL vehicles, in which the engine size is virtually always driven by take-off power requirements. Counter-rotating fans may also eliminate the need to cancel engine torque in hover. In addition, the wing's inboard section and two vertical surfaces form a cruciform in the downwash of the ducted fans; flaps on this cruciform provide control during hover and transition.

A purpose of the empennage is to give the aircraft stability. The empennage 210 generally comprises two fixed parts, the horizontal stabilizer 210b and the vertical stabilizer 210a. The horizontal stabilizer 210b may be used to prevent the REVLAR UAV 200 from pitching up or down. The rear portion of the horizontal stabilizer 210b may employ an elevator, which is usually hinged to the horizontal stabilizer 210b. Generally speaking, an elevator is a movable airfoil that may be used to control the up-and-down motion of an aircraft's nose during wing-borne flight.

The vertical tail structure may be divided into the vertical stabilizer 210a and the rudder. The vertical stabilizer 210a is the fixed front section and may be used to prevent the aircraft from yawing back and forth. In propeller driven UAVs (e.g., single propeller), the vertical stabilizer 210a may also be used to offset the tendency of the UAV to roll in the opposite direction in which the propeller is rotating. The rear section of the vertical structure often includes a rudder—a movable airfoil that may be used to turn an aircraft during wing-borne flight.

However, for a REVLAR UAV 200, the horizontal stabilizer 210b on the empennage 210 may be all-moving. Thus, during low speed, high angle-of-attack flight, the empennage 210 can remains unstalled for longitudinal stability and control. An all-moving horizontal stabilizer is sometimes referred to as a stabilator. Essentially, an all-moving stabilizer, or stabilator, is an aircraft control surface that combines the functions of an elevator and a horizontal stabilizer. Specifically, while most fixed-wing aircraft control pitch using a hinged horizontal flap—the elevator—attached to the back of the fixed horizontal stabilizer, some aircraft make the entire stabilizer movable. Because it involves a large moving surface, a stabilator can allow the pilot to generate greater pitching moment with little effort.

The wing can sometimes present a problem when it is stalled (e.g., during VTOL and/or transition)—vortex shedding off the wing can be non-uniform (especially in gusts), and for a high aspect ratio wing, this can lead to wing rock. Accordingly, if it is determined, e.g., by an onboard computer or operator, that these forces cannot be stabilized with the duct vane surfaces alone, the empennage's all-moving wing tips can be implemented to counter the instability. In certain aspects, both the horizontal and vertical stabilizers may be all-moving.

Upon liftoff, a VTOL vehicle transitions to hover via a continuous set of trim points, reducing forward speed as more of its weight becomes supported by vectored thrust. Attitude during vertical descent is typically about 90 degrees, necessitating quaternion-based attitude control. After the REVLAR UAV's 202 empennage 210 touches down (e.g., makes contact with the ground 212), which may be detected either by a squat switch or a simple altitude rate estimator in the flight control system, the pogo support 204 may deploy from and/or re-stowed (e.g., retracted) into or alongside the fuselage 208 in the directions of motion A. The pogo support 204 may be spring-loaded, thereby enabling quick deployment from the fuselage 208.

Duct flaps may be used to provide control to smoothly rotate the vehicle forward, into a stable tripod launch and recovery configuration on the ground 212. The tripod attitude and overall weight-and-balance must be such that for takeoff the duct flaps can cause the vehicle to rotate about the tail 210 and achieve a vertical attitude with the thrust well below the lift-off value.

As with other phases of flight, this transition from horizontal to vertical flight is expected to be a smooth transition through a set of trim states. In certain aspects, the set of trim states may be actively stabilized. Avoiding dynamic transitions is a tenet that may be employed to increase robustness. The pogo 204 landing support can be re-stowed using a simple pinion mechanism that overcomes the spring loads in the deployment mechanism—this simple positive-deploy/ servo stow approach is used on general aviation gear to ensure reliability, since flying with gear deployed is much safer than landing without gear deployed. However, other mechanical methods known in the art could be used to re-stow the pogo 204 inside of along side the fuselage 204 (e.g., retracted or swung). Exemplary mechanical methods may take advantage of, for example, one or more of the following gear systems; pinion, worm drives, sun and planet gears, and the like.

Figure 2C:
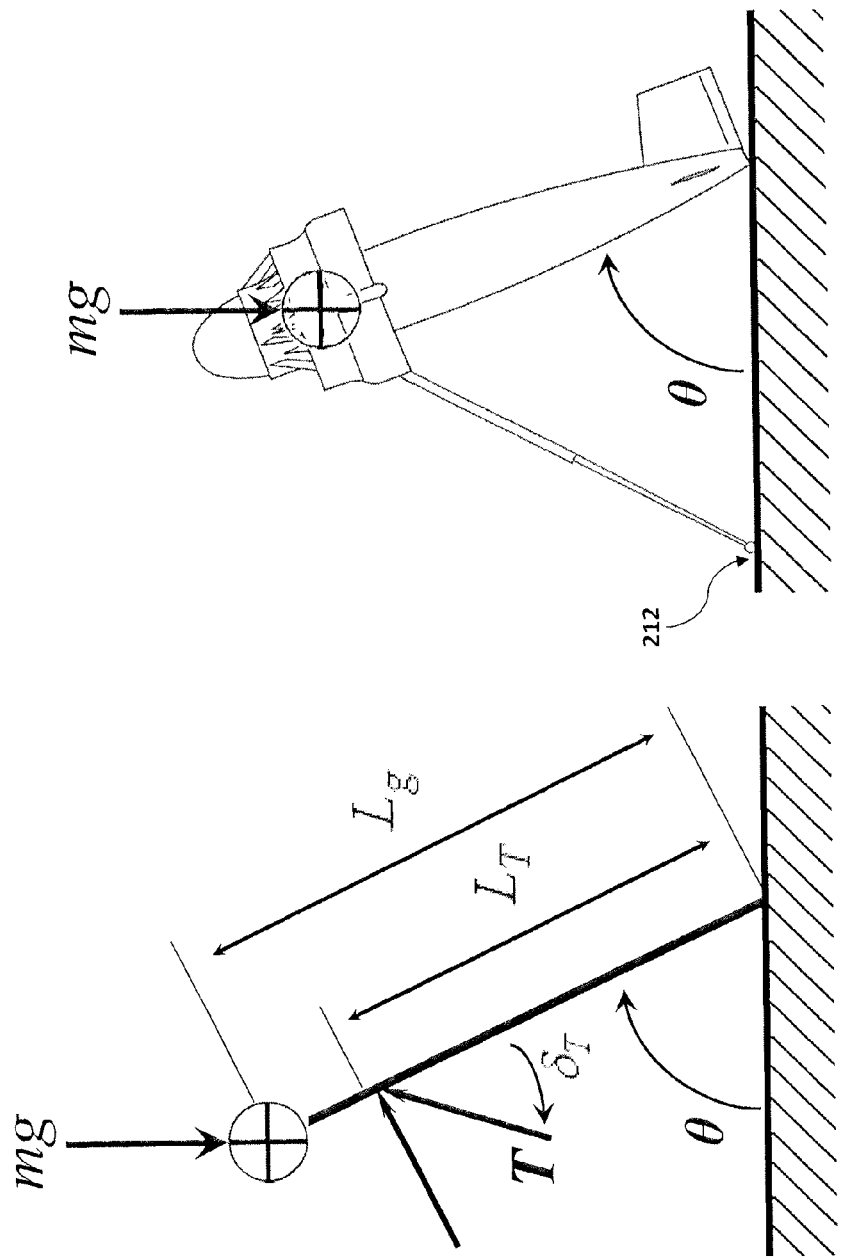
FIG. 2c illustrates an exemplary diagram for calculating a stand-up angle (e.g., launch angle)

Turning now to FIG. 2c and Equation 2, the diagram illustrates exemplary target requirements for a non-skittering rotation capable of launch, or takeoff. To start, torque T about the pivot point is computed. Torque T for the vectored component of thrust must overcome the torque of the vehicle weight. The minimum stand-up angle θ shown here assumes that thrust (T/mg) is maintained below 80% weight to prevent skittering, and the application of thrust is at the center of gravity. More specifically, T is the thrust of the engines, dt is angle that the thrust can be deflected with respect to the fuselage using flaps or other thrust-vectoring techniques, $L_T$ and $L_g$ are the distances from the pivot point on the ground to the point of thrust application and the center of gravity, respectively. m is the mass of the vehicle, g is the acceleration of gravity, and θ is the angle that the vehicle make with the ground.

During vehicle rotation, thrust T should be well below (for instance, 80 percent of) the weight (mg) to maintain friction at the pivot point, and the ratio $L_T/L_g$ is approximately one due to the proximity of the center of gravity to the engines. Finally, it is assumed that thrust vectoring of about 30 degrees can be achieved. As illustrated by Equation 2, this results in a minimum θ value (stand-up angle) of 66 degrees for the on-ground attitude of the vehicle.

$$(T\sin\delta_T)L_T > (mg\cos\theta)L_g \quad \text{Equation 2}$$
$$\cos\theta < \left(\frac{T}{mg}\right)\left(\frac{L_T}{L_g}\right)\sin\delta_T$$
$$\tilde{<}(0.80)(1)(0.5)$$
$$\theta > \cos^{-1}(0.4)$$
$$\theta > 66°$$

A design trade-off in determining the best overall configuration for a particular application is to understand the best landing altitude for stability on the ground, as well as ease of transition back to hover. The autonomous take-off phase is prone to complex ground interaction involving 'skittering' across the ground or otherwise accelerating in unwanted ways during transition from weight-on-skids to air. For example, if thrust vectoring is sufficient to rotate the vehicle to vertical while significant weight (perhaps 20% of the vehicle weight) is still supported by the tail, these effects can be virtually eliminated. This limits the attitude after landing to at least 66 degrees, as shown in FIG. 2c. Higher attitudes require either less thrust (T) or less thrust vectoring (dt) to rotate based on Equation 2, but provide less resistance to tip-over from gusts. Accordingly, an example stand-up angle value between 45 and 90 degrees may be suitable; more preferably between 60 and 80 degrees, and most preferably between 66 and 75 degrees.

Turning now to FIGS. 3a-3d, rather that using the single pogo support 204 of FIGS. 2a and 2b, a REVLAR UAV 300, according to a second aspect, may be equipped with canted hinges 308 on the wings 306, thereby enabling the wing tips, or distal ends of the wing structure, and tail 312 to form a tripod launch and recovery configuration. Apart from the lack of the single pogo support 204 and canted hinges 308, which enabled a canted wing configuration, the REVLAR UAV 300 of FIGS. 3a-3d is otherwise substantially similar to the REVLAR UAV of FIGS. 2a-2c. Accordingly, the same propulsion techniques, airfoil designs, angle calculations, techniques, and the like make be applied.

Figure 3C:
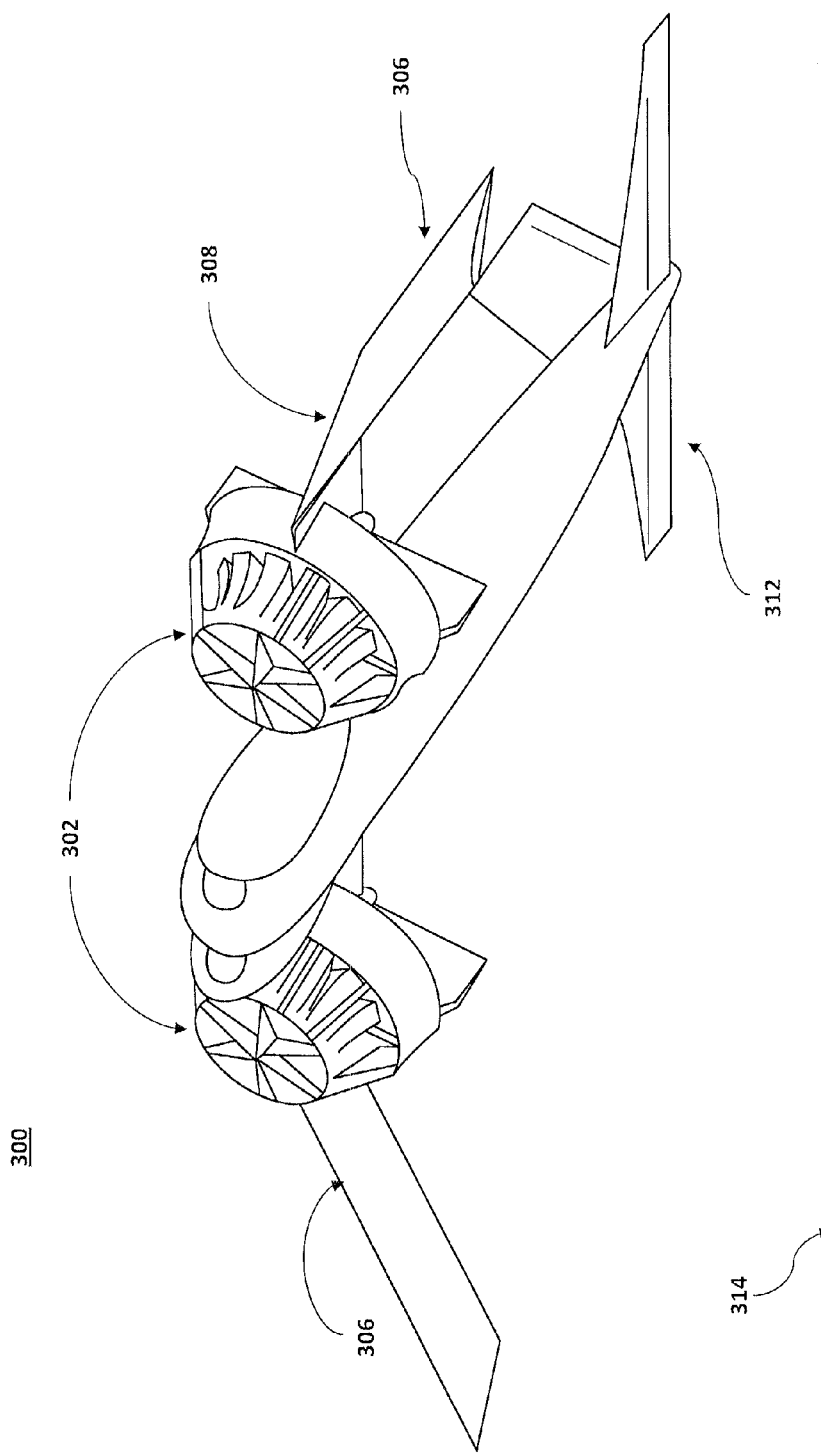
FIG. 3c illustrates a front angular perspective of the second REVLAR UAV configuration in a second transitional phase.

Depending on a designer's needs, the distal ends of the REVLAR UAV's 300 wing 306 may include retractable pogo supports 304 to widen the UAV's 300 stance on the ground and to increase the stand-up angle without requiring a longer wing. As illustrated in FIG. 3a, pogo supports 304 may be deployed from the wing tips (e.g., distal ends), so that the fully folded wing plus pogo supports 304 form a tripod launch and recovery configuration when combined with the empennage 312. As will be discussed below, FIGS. 3a through 3d illustrate four exemplary wing-droop settings encountered when transitioning from ground to wing-borne flight.

Specifically, FIG. 3a illustrates the REVLAR UAV 300 on the ground with the wing 306 in a canted wing configuration. This may be accomplished by bending the canted hinges 308 to a predefined maximum bend angle. As illustrated, the resulting REVLAR UAV 300 has a wide stance and low center of pressure on the ground—both characteristics assist in preventing the REVLAR UAV 300 from tipping over. As previously mentioned, the stance may be widened by including retractable pogo supports 304. The retractable pogo supports 304 also provide the added benefit of increasing the stand-up angle θ without requiring that the wing 306 be lengthened. As in the REVLAR UAV 200 of FIG. 2b, depending on the design needs of the REVLAR UAV 300, the retractable pogo support 304 may be of a fixed length or telescopic.

Turning now to FIG. 3b, the REVLAR UAV 300 is shown as having entered the second phase of the take-off transition—the wing's 306 canted hinges 308 have begun to straighten out. In addition, the retractable pogo supports 304 have been re-stowed (e.g., retracted) into the wing 306 to avoid, for instance, unnecessary drag. As described above, in relation to FIGS. 2a and 2b, the pogo supports 304 may be retracted using, for example, a pinion mechanism that overcomes the spring loads in the deployment mechanism. Alternatively, electromagnets, solenoids, or other similar means, may even be used to provide a retracting pulling force.

Figure 3D:
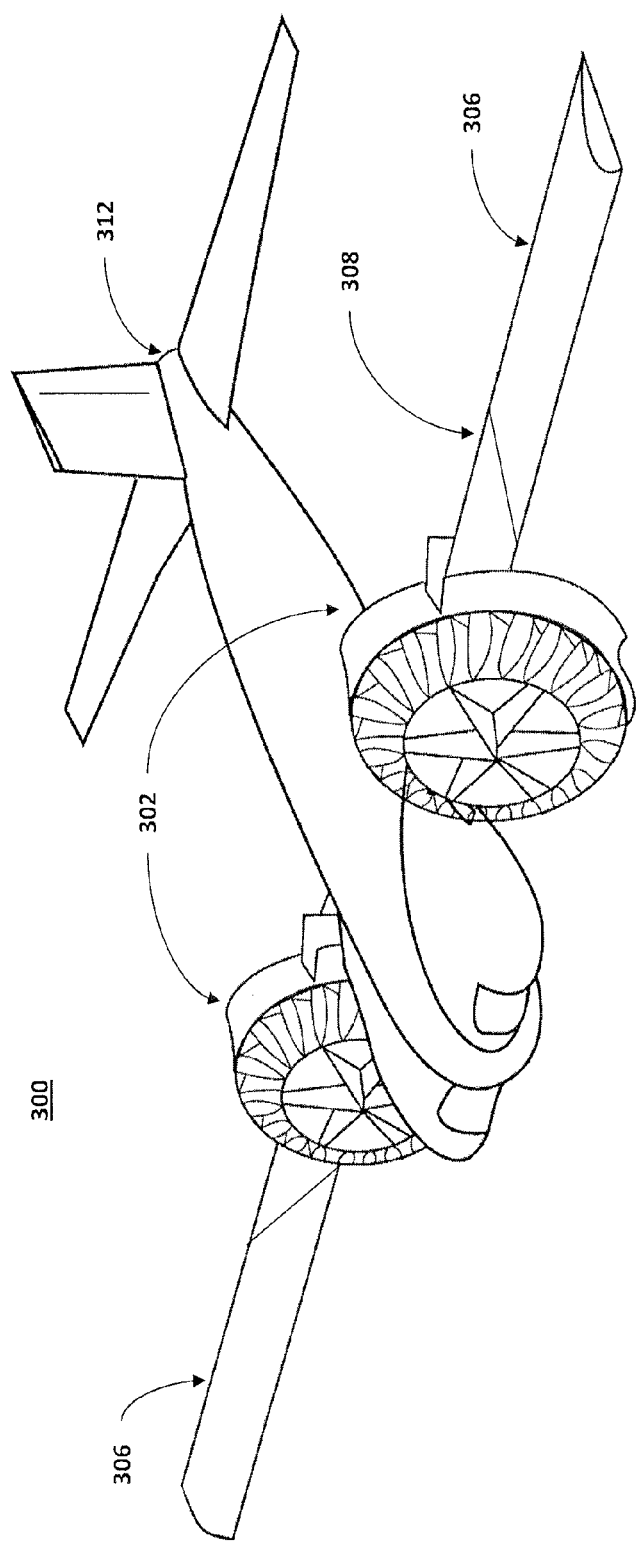
FIG. 3d illustrates a front angular perspective of the second REVLAR UAV configuration in flight.

As illustrated, the outboard wing portions (e.g., the span between the cant hinge 308 and the distal ends of the wing 306) may be maintained at a low angle of attack (alpha) during the steady-state transition to hover. FIG. 3c illustrates the third phase of the take-off transition where the canted wing 306 has continued to straighten out via the cant hinges 308 as the REVLAR UAV 300 gains altitude. Finally, FIG. 3d illustrates the fourth and final phase where the wing 306 and cant hinges 308 have fully extended and are said to have been straightened out. In other words, the wing 306 has transformed to a substantially straight wing configuration. At this point, the REVLAR UAV 300 may enter a horizontal, wing-borne state.

Maintaining vehicle stability and control during high-alpha operation, and the associated potential need to add all-moving tip surfaces to stabilize wing rock, are some of the drawbacks to conventional configurations for performing high-alpha 'deep stall' maneuvers to perform high glide-slope landings. As in known in the art, alpha refers to the angle of attack—the angle between a reference line on a lifting body (often the chord line of an airfoil) and the vector representing the relative motion between the lifting body and the air/fluid through which it is moving.

The portions of wing 306, which are immediately outboard of the engines (e.g., propulsors) 302, are used to overcome these difficulties. The cant (or bend) in the hinge 308 causes the angle of attack of the outboard section of the wing 306 to be reduced. As shown in FIGS. 3a-3d, at each vehicle attitude there exists a hinge bend angle that brings the wing into a low-alpha, lift producing configuration. Together with the all-moving horizontal tail empennage, this approach enables the REVLAR UAV 300 to achieve trim while minimizing wing stall down to very low speed.

Landing proceeds in a controlled, low-speed descent, but is more robust than typical tail-sitters due to the very wide stance of the vehicle on the ground. Besides solving the high-alpha controllability problem, the canted wing geometry can be used for active gust load alleviation in up-and-away flight. For landing, the pogo supports 304 may be deployed from the wing 306 at the tips as described and illustrated in FIG. 3a.

Consequently, employing canted hinges 308 in a wing 306 assists in avoiding the necessity for a dynamic transition (e.g., untrimmed flight requiring precise maneuvering) during the takeoff of a REVLAR UAV, while also providing a stable base for the REVLAR UAV 'tail-sitter' take-off and landing configuration show in FIG. 3a. Advantageous features of a REVLAR UAV 300 having canted hinges include, for example: (1) VTOL takeoff can be accomplished by rotating the vehicle about the tail boom/ground contact point using thrust vectoring while transitioning from stationary to vertical flight; (2) on the ground, the canted hinge-pogo design provides a broad, stable base with low center of pressure to help prevent tip over; (3) during landing, outboard panels remain at low angle of attack, providing trim at low speed.

A third REVLAR UAV configuration involves a modification of the free wing concept, and is shown in FIGS. 4a-4d—this type of wing configuration being more commonly known as tiltwing. Turning now to FIGS. 4a through 4d, a third REVLAR configuration is shown that uses a form of tiltwing that involves rotating the fuselage 404 freely from the wings 406 and engines 402 to enable ground recovery and re-launch. Again, the concept of operations are substantially the same as the REVLAR UAV of the previous examples, except for lack of pogo and launch and recovery.

For launching the REVLAR UAV 400, a mechanical latch device is released to enable the tiltwing configuration (e.g., the ability to transition from a vertical configuration to a horizontal configuration). In a first phase of takeoff, the wings 406 are in the vertical configuration. As the engine 402 thrust is increased with the wings 406 in the vertical configuration, the nose end of the fuselage begins to lift off the ground 408 while the tail end initially remains on or near the ground 408, thereby causing to fuselage 404 to be non-parallel to the ground 408. During a second phase of takeoff, as the engine 402 thrust continues to increase and the wing 406 begins to transition from the vertical configuration to the horizontal configuration (e.g., the fuselage 404 freely rotates) until the fuselage 404 has achieved a predetermined stand-up angle. The standup angle may be calculated using the methods of FIG. 2c or the standup angle may simple be substantially vertical to the ground 408 (e.g., ~90 degrees). At this point in the transition, the wings are nearing the horizontal configuration. During a third phase of takeoff, the wing 406 had achieved the horizontal configuration and the aircraft is capable of wingborne flight. Once the wings are in their horizontal configuration, the mechanical latch device is enabled, thereby locking the wings in the horizontal configuration and preventing the fuselage 404 from freely rotating.

For recovery, the REVLAR UAV 400 performs substantially the same phase sequence as the launching procedure, but in reverse order. Specifically, when the REVLAR UAV 400 contacts the ground 408, whether vertically or at an angle, and as thrust is reduced, the mechanical latch device is released, thereby re-enabling the tiltwing configuration and allowing the fuselage 404 to rotate with respect to the wings 406. Thrust continues to reduce to a value required to support the wing structure 406, but not the fuselage 404. At this point, the wings 406 begin to drop, and the fuselage 404 rotates or slides out from under the wings 406. The fuselage 404 at the completion of touchdown is horizontal to the ground 408, but the wings 406 and engines 402 remain oriented vertically. This configuration has an extremely low center of gravity, and the recovery procedure can simply be reversed for re-launch (i.e., takeoff). As noted, the tiltwing configuration includes a mechanism for mechanically unlatching-latching that will lock the wing positively in place during takeoff/wingborne flight, and allow the wing to unlock during landing or transition. For instance, a tapered pin that is actuated to protrude from the fuselage. The tapered pin may be configured to engage a hole in the root spar of the wing that would both align the wing with the fuselage and hold it in place. Other mechanisms are possible, including, for example, direct servo-drive of the wing tilt axis, a spring-loaded latch mounted on the wing which engages a release mechanism in the fuselage.

Figure 4A:
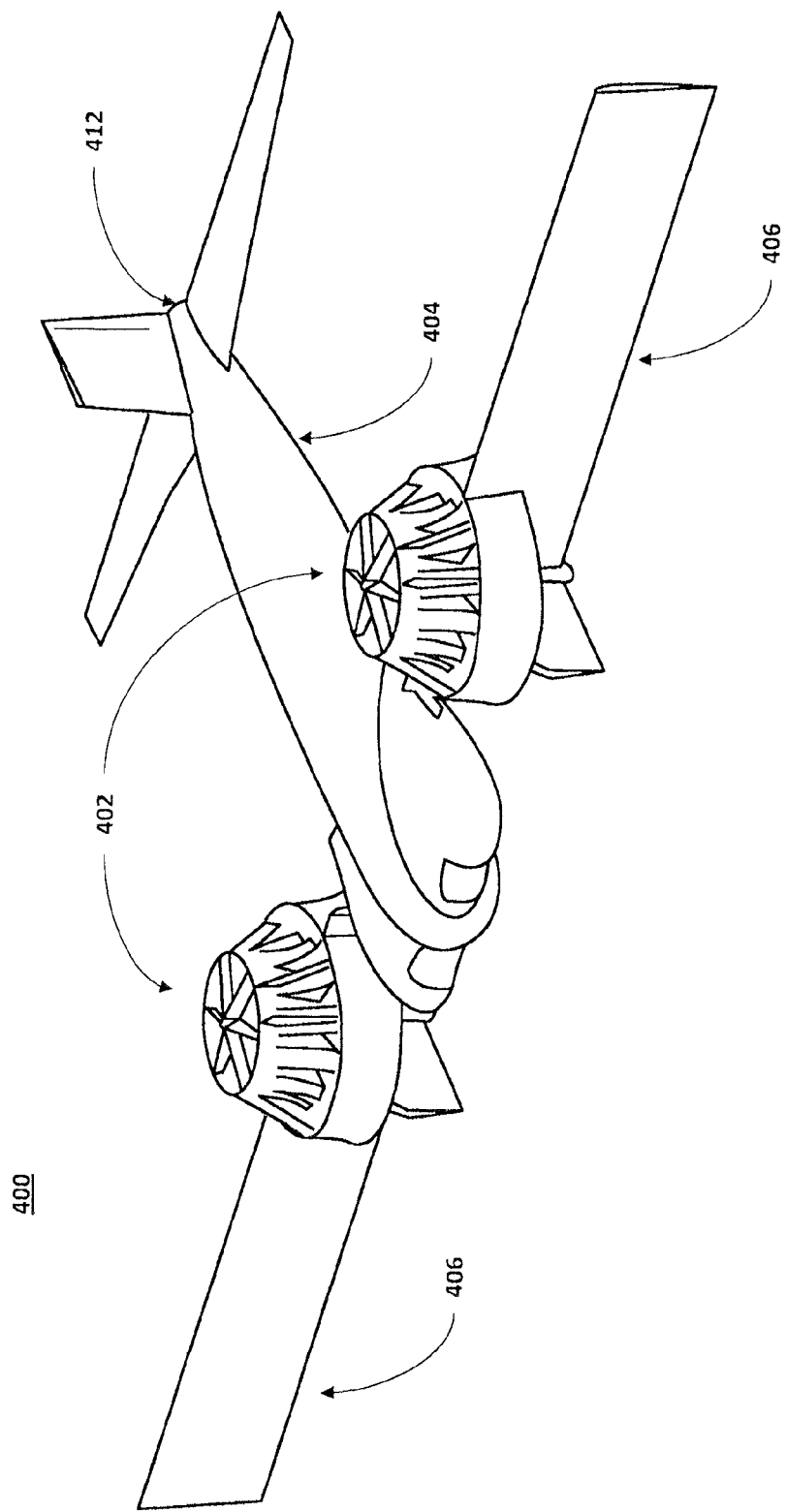
FIG. 4a illustrates a front angular perspective of a third REVLAR UAV configuration on the ground.

Specifically, FIG. 4a illustrates the REVLAR UAV 400 on the ground, in a take-off position where the portions of the wings 406 between the fuselage 404 and the distal ends of the wings 406 are vertically oriented with respect to the fuselage. The pivoting wing portions may be pivotally coupled either to the remaining portion of the wing, or directly to a fuselage using one or more known techniques. For example, a rotating shaft may be employed. For example, a rotating shaft that is co-located with the main spar, may be employed. The shaft may be rigidly and/or internally mounted to either the outboard or inboard portion of the wing or the fuselage, and rotating on roller bearings on the other portion.

As illustrated, the REVLAR UAV 400 has an extremely low center of gravity and is laying substantially flat on the ground, thereby virtually eliminating any risk of the REVLAR UAV 400 from tipping over. Prior to liftoff, the fuselage 404 is substantially perpendicular to the wings 406 and the pivotable combination of engine 402 and wing portion are vertical—pointing upward, toward the sky.

Figure 4B:
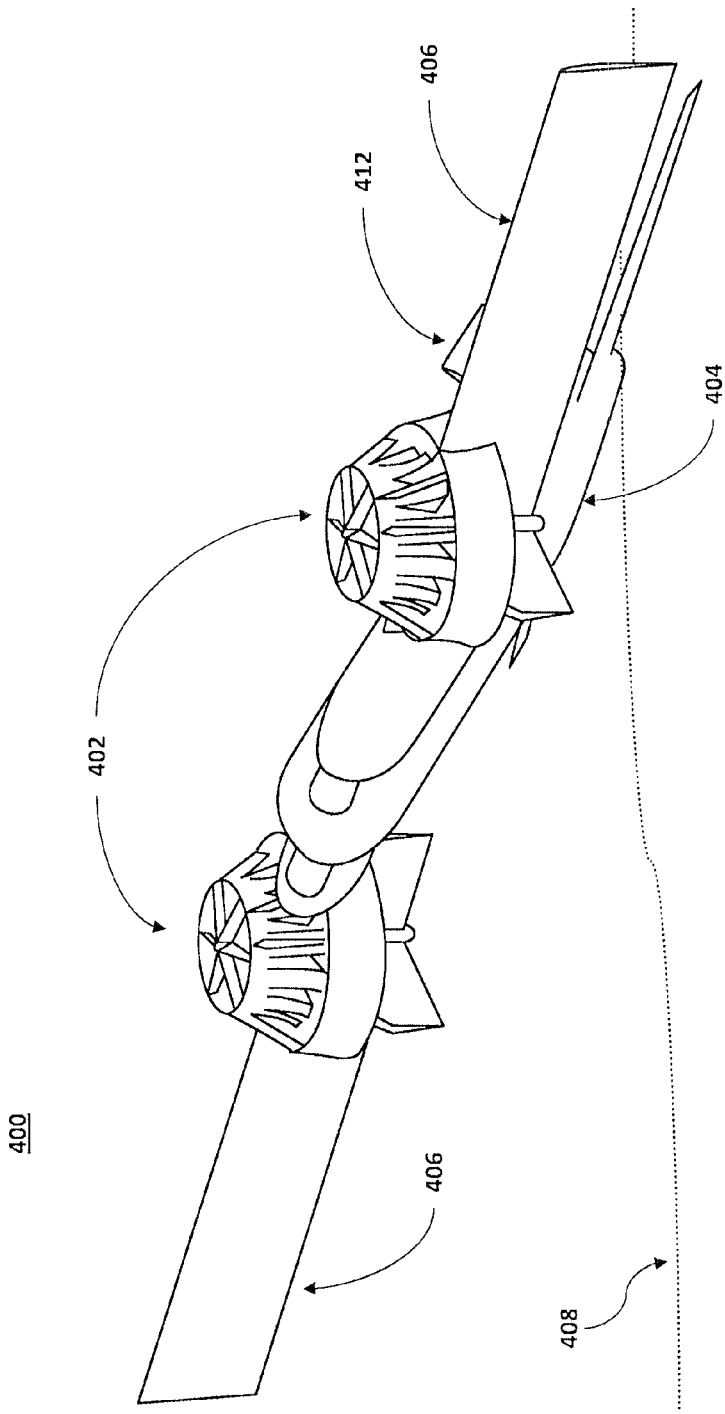
FIG. 4b illustrates a front angular perspective of the third REVLAR UAV configuration in a first transitional phase.
Figure 4C:
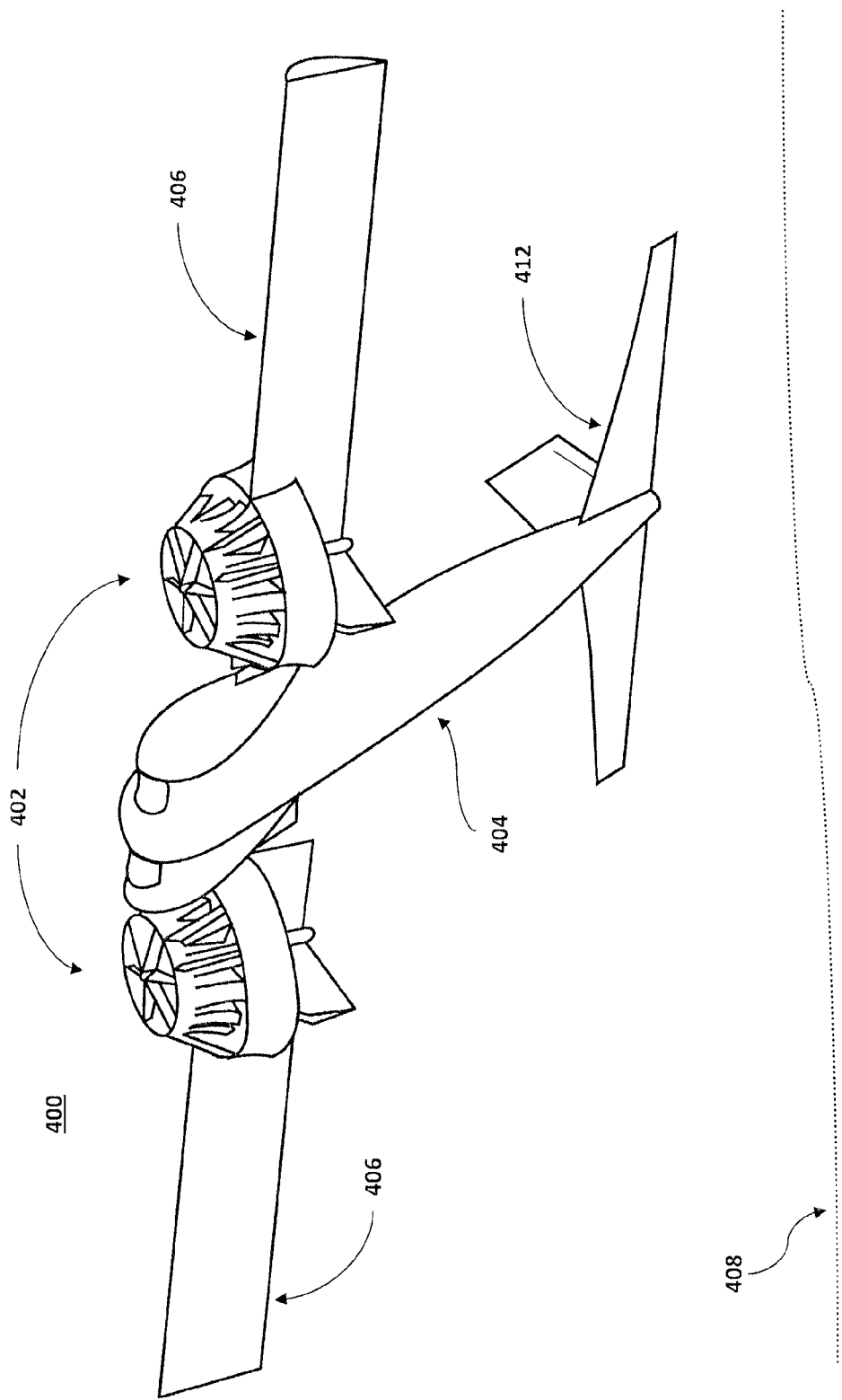
FIG. 4c illustrates a front angular perspective of the third REVLAR UAV configuration in a second transitional phase.
Figure 4D:
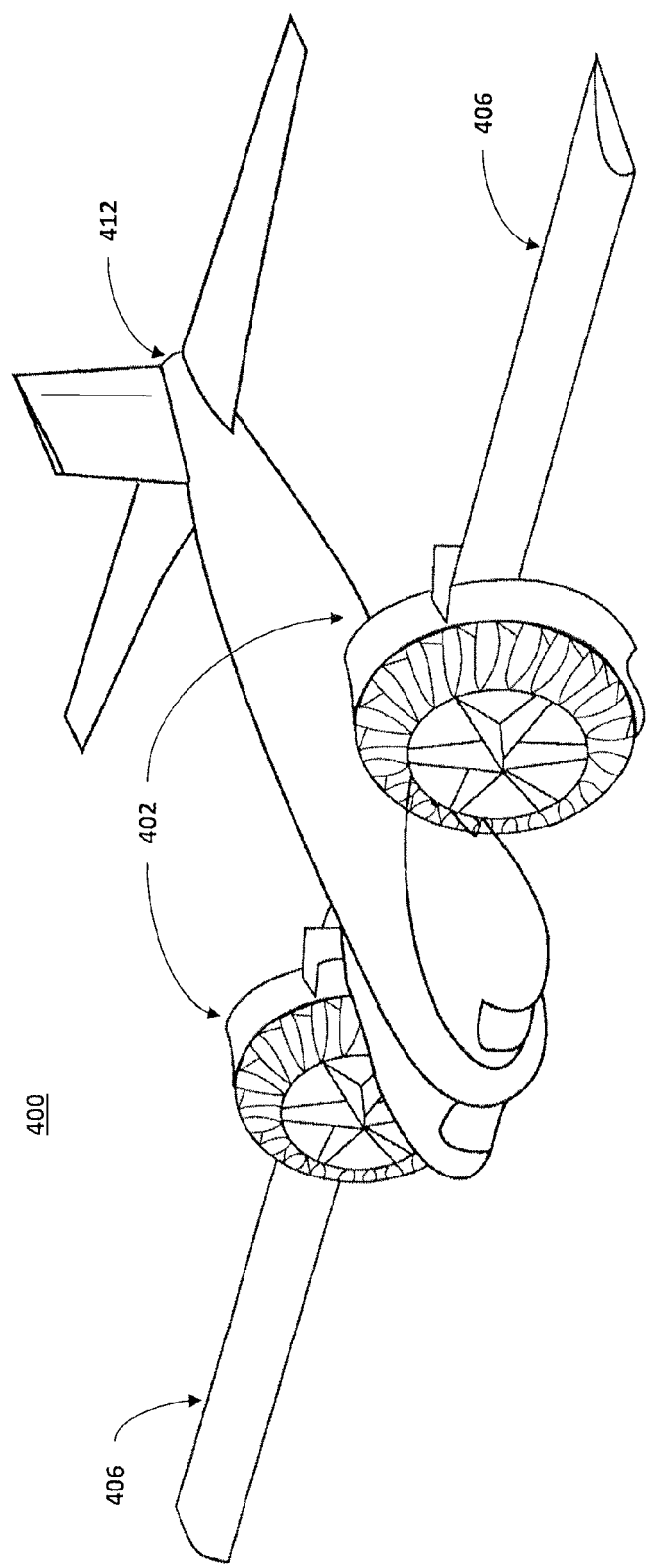
FIG. 4d illustrates a front angular perspective of the third REVLAR UAV configuration in flight.

Turning now to FIG. 4b, the second phase of the take-off transition is illustrated. As the REVLAR UAV's 400 engines 402 increase the output thrust, the engines 402 and wing portions 406 begin to vertically lift off of the ground 408, causing the nose portion of the fuselage 404 to point upward, wherein the tail 412 section is still in contact with, or closer to, the ground 408. FIG. 4c illustrates the third phase of the take-off transition where the fuselage 404 has continued to pivot and is now almost parallel with the wings' 406 direction and the direction of engine thrust. In other words, the outer portions of the wings 406 are approaching the horizontal configuration. Finally, FIG. 4d illustrates the fourth and final phase where the wings 406 portions have fully pivoted and are horizontal with respect to the fuselage 404; in other words, the wing is substantially parallel with the fuselage 404. At this point, the REVLAR UAV 400 has achieved wing-borne state.

For the three REVLAR configurations discussed above and illustrated in FIGS. 2a through 4d, the weight of the REVLAR UAV should be about the same, regardless of configuration. Specifically, the weight breakdown of an exemplary REVLAR UAV is provided in Table 1 below.

TABLE 1

| | |
|---|---|
| Structure (20% GTOW) | 14 |
| Payload | 5 |
| Twin Ducted Fans | 10 |
| XRDi 12 HP Engine | 16 |
| Three Gearboxes | 11 |
| Fuel | 14 |
| Total | 70 |

Turning now to FIGS. 5a and 5b, these figures illustrate an exemplary avionics system 500 component diagram for controlling a REVLAR UAV 502. For clarity, the complex aircraft power and control systems are excluded from the figures. Turning now to FIG. 5a, an exemplary avionics system 500 generally comprises three primary components: a REVLAR UAV 502; a ground control station 504; and a ground service module 506.

Turning now to FIG. 5b, the diagram of FIG. 5a is illustrated in greater detail. The REVLAR UAV 502 may include any one of the UAVs disclosed in FIGS. 2a-4d. The REVLAR UAV 502 typically includes an on-board vehicle computer 524 that is responsible for controlling the various aircraft components and functions. The vehicle computer 524 may be communicatively coupled with a remote input/output unit 530 (e.g., Power DNA Cube—DNA-PPC5), a Inertial Navigation System (INS) 522 (e.g, Raytheon Advanced Protection Technology Receiver (RAPToR)) that is communicatively coupled with an inertial measurement unit 526 and GPS receiver, a user interface panel 532, an on-board memory device 560 (e.g., hard drive, flash memory, or the like), or other services 520. The remote input/output unit 530 may be communicatively coupled with Microair UAV Transponder 534, engine control unit (ECU) 536, Power Switching 538, Power System Status 540 and an Airdata/Mag unit 542. The remote input/output unit 530 may be communicatively coupled with the user interface panel 532 for maintenance and with a payload 528 (e.g., SMEP DRS) for control.

To facilitate wireless communication with the ground control station 504, the REVLAR UAV 502 further comprises an air communication link 510 enabled to transmit (TX) and receive (RX) power using one or more antennas (e.g., top and bottom) via a circulator 516, LNE 512 and RFE 514. To collect data and monitor an area, the REVLAR UAV may be equipped with a traditional ISR surveillance payload. For example, the REVLAR UAV 502 may be equipped with one or more cameras 508, audio devices, and the like. Any video, or other data, collected by the REVLAR UAV 502 may be wirelessly communicated to the ground control station 504 in real time. The REVLAR UAV 502 may be further equipped to store said video and data to the on-board memory device 560. If the REVLAR UAV 502 is operated in an unfriendly zone, it may be advantageous to implement a data self-destruction protocol. The REVLAR UAV 502 may be programmed to erase, or otherwise destroy, the on-board memory device 560 if the REVLAR UAV 502 determines that it may have fallen into an enemy's possession. For example, the REVLAR UAV's 502 on-board memory device 560 may automatically erase upon touching down in a location outside of a predefined radius from the launch area, based on GPS calculations, or if a crash is detected, e.g., based upon a sudden impact.

The ground control station 504 is used to wirelessly control the operation of one or more REVLAR UAVs 502, including, at least, launch, recovery, and flight. The ground control station 504 may be a portable station such as, for example, a mobile command center, remote controller, and the like. A portable ground control station 504 may be advantageous in that it enables UAV 502 deployment from nearly any location with minimal preparation. Alternatively, the ground control station 504 may be stationary, such as those found in substantially permanent structures and buildings, whether local, or remotely controlled from a distance via a communication network (e.g., the internet, wireless phone network, etc.).

An exemplary ground control station 504 may comprise a vehicle control station 552 to a ground communication link 550 for communication with a REVLAR UAV 502. An exemplary ground communication link 550 may include the EnerLinksIII™ Intelligence, Surveillance and Reconnaissance (ISR) system, available form ViaSat, Inc. at http://www.viasat.com/government-communications/isr-data-links/enerlinks. The vehicle control station 552, which is communicatively coupled to the exemplary ground communication link 550, may include one or more user interface devices, thereby allowing a person to operate and monitor the REVLAR UAV 502 from the ground control station 504. Exemplary interface devices may include, for example, one or more joysticks, throttles, buttons, and any other controllers that may be useful in controlled flight and/or surveillance. The vehicle control station 552 may also include one or more audio/visual devices, thereby permitting the user to monitor the REVLAR UAV 502 from a distance. For example, the video signal from the camera 508 or any other data, including location, may be wirelessly communicated to the ground control station and displayed using said audio/visual devices. An exemplary Vehicle Control Station 552 may employ or incorporate CDL Systems Ltd.'s VCS-4586. For additional information on the VCS-4586, see, for example, CDL Systems Ltd website at http://www.cdlsystems.com/index.php/vcs4586.

The ground communication link 550 may communicate with the REVLAR UAV 502 using four or more radio interface modules 546 and pointing systems 544. The ground control station 504 preferably communicates with the REVLAR UAV, using L band or another spectrum reserved for military use. L band refers to four different bands of the electromagnetic spectrum: 40 to 60 GHz (NATO), 1 to 2 GHz (IEEE), 1565 nm to 1625 nm (optical), and around 3.5 micrometers (infrared astronomy). In the United States and overseas territories, the L band is generally held by the military for telemetry.

A real-time kinematic (RTK) system 548 may also be coupled to the ground communication link 550 to provide positioning information in cooperation with a GPS transmitter and antenna. RTK satellite navigation is a technique used for land and hydrographic survey. RTK technology may be based on the use of carrier phase measurements of the GPS, Globalnaya navigatsionnaya sputnikovaya sistema (GLONASS) and/or Galileo signals where a single reference station provides the real-time corrections, providing up to centimeter-level accuracy.

The ground service module 506, on the other hand, is primarily used for ground maintenance. Ground maintenance may include, for example, updating the REVLAR UAV's 502 software, firmware, diagnostics, battery charging, and the like. Like the ground control station 504, the ground service module 506 may be portable or stationary, depending on the needs of the particular user. However, because the ground service module 506 is often connected to the REVLAR UAV 502 using a wired connection, the ground service module 506 is preferably accessible to the launch and/or recovery location. The ground service module 506 generally comprises a battery charger 554, AC-DC converter 556, and ENET switch 558. The AC-DC converter 556 is enabled to receive AC current from a ground power source (e.g., 120 VAC) and covert it to a usable DC power (e.g., 28 volts). The AC-DC converter 556 may be used to provide power to the REVLAR UAV 502 and/or the battery charger 554. The REVLAR UAV 502 is typically connected to the ground service module 504 via a wired connection, such as a cable bundle or umbilical. This wired connection may be used to carry both current and data signals. One or more switches or relays may be used to selectively connect the battery charger 554 and AC-DC converter 556 to the REVLAR UAV 502. Accordingly, the REVLAR UAV 502 may receive power directly from the AC-DC converter 556 or use the battery charger 554 to charge any on-board batteries. Finally, the ENET switch 558 may be used for maintenance (e.g., diagnostics) and other data transfers (e.g., software updates or backup).

While avionics systems may be specifically designed for use in the above REVLAR configurations, existing avionics systems may be adapted for REVLAR configurations. For example, existing avionics systems, such as those used for the Aurora GE-50, GE-80, Excalibur, Orion, Vulture, and Skate, might be adapted for use with a REVLAR UAV. Avionics components in these architectures may include the flight control system (GPS-INS and flight computer), communications, ground servicing equipment, and ground control station (GCS). Many of Aurora's systems use the TRL 9 VCS-4586 Vehicle Control Station software from CDL systems for the GCS, and employ an on-board vehicle management computer that houses a STANAG-4586 compliant Vehicle Specific Module (VSM). Lower cost implementations such as Skate use Aurora's miniature Autopilot, which has been adapted to a number of low-cost flight test efforts, and is part of Skate's military-ready product.

Verifying the control strategy for the REVLAR vehicle, a medium fidelity simulation can adequately predict behavior in the regime from hover to low-speed flight. Trim, stability, and controllability properties may use the resulting vehicle aerodynamics, combined with test stand-verified models of ducted fan performance and control effectors in duct flows.

Torque commands from the vehicle control laws are subsequently passed through control allocation software that performs control surface mixing in the face of saturation and nonlinearities. In thrust-vectored applications, nonlinearities arise from kinematic effects at high angles of attack, large thrust vectoring angles, and from the duct vanes themselves. Saturations are a primary concern during hover-to-land operations; winds typically cause saturation in the axis, which must turn the vehicle into the wind to maintain position.

Trim calculations, linearizations, and control law designs should be calculated at a number of representative conditions across the flight envelope to demonstrate the feasibility of robust control, for the down-selected REVLAR configuration. For instance, steady winds from various headings, superimposed with Dryden gust spectra, may be used to demonstrate the robustness of the vehicle-controller combination, the adequacy of the control power, and the repeatability of recovery. Transition from air to ground may be modeled using ground-interaction approaches developed for other auto-land programs for VTOL vehicles. Controlled rotation (vehicle weight balanced at all times) and 'gravity-assisted' rotation (vehicle allowed to accelerate about the touchdown point) may also be applied to tripod landing.

Once any problems of trim, stability, and control is solved through careful vehicle design, robustness to winds and gusts may be a challenge when developing a fully autonomous vertical takeoff and landing. However, two solutions may be used to increase robustness—which may be used together or individually.

The first method is to descend quickly. Certain aircraft may be configured to execute a deep stall to affect a precipitous recovery to a relatively small area. While this approach is not viable for vehicles much larger than the REVLAR, because this maneuver can cause catastrophic damage on impact, a controlled vertical descent at 5 to 10 meters per second (depending on the prevailing winds and gusts), terminating in a hard, positive landing, should be robust and repeatable without incurring undue wear-and-tear on the vehicle.

The second method is to measure and reject winds and gusts. While this approach is more complicated in that it requires additional sensors, this approach provides greater accuracy. For instance, in very severe wind and gust situations, not only will alpha and/or beta measurements be extremely useful, but in some cases distributed measurement, e.g., left vs. right wing, will significantly improve accuracy and effectiveness. Exemplary sensors suitable for incorporation are available through Aeroprobe Corporation. For additional information, see, for example, Aeroprobe Corporation's website at http://www.aeroprobe.com and their line of air data probes, available at http://www.aeroprobe.com/uploads/Air-Data-Applications-for-web.pdf.

While the present invention has been described with respect to what are currently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

All U.S. and foreign patent documents, all articles, all brochures, and all other published documents discussed above are hereby incorporated by reference into the Detailed Description of the Preferred Embodiment.

What is claimed is:

1. A vertical take-off and landing (VTOL) aircraft comprising:
   a fuselage;
   an empennage located at a tail end of the VTOL aircraft, wherein the empennage is configured to engage the ground during a launch operation;
   a wing; and
   a retractable pogo support to deploy from the fuselage and engage the ground during the launch operation, wherein the retractable pogo support and the empennage define a tripod support to support the VTOL aircraft during the launch operation.

2. The VTOL aircraft of claim 1, wherein the retractable pogo support is deployed using a spring.

3. The VTOL aircraft of claim 1, wherein the tripod support supports the fuselage at a predetermined stand-up angle during the launch operation.

4. The VTOL aircraft of claim 3, wherein the predetermined stand-up angle is between 45 and 90 degrees.

5. The VTOL aircraft of claim 4, wherein the predetermined stand-up angle is between 65 and 75 degrees.

6. The VTOL aircraft of claim 1, wherein the wing has an aspect ratio of at least 10.

7. The VTOL aircraft of claim 1, wherein the VTOL aircraft comprises a first wing-mounted engine and a second wing-mounted engine, wherein the first wing-mounted engine and the second wing-mounted engine and are positioned on opposite sides of the fuselage.

8. The VTOL aircraft of claim 7, wherein the first wing-mounted engine and the second wing-mounted engine counter-rotate relative to one another.

9. The VTOL aircraft of claim 7, wherein the wing is a fixed wing.

10. The VTOL aircraft of claim 7, wherein the first wing-mounted engine and the second wing-mounted engine are configured to pivot relative to the fuselage about a transverse axis.

11. The VTOL aircraft of claim 7, wherein the wing is configured to pivot relative to the fuselage about a transverse axis.

12. The VTOL aircraft of claim 1, wherein the VTOL aircraft comprises a payload for intelligence, surveillance, and reconnaissance.

13. The VTOL aircraft of claim 1, wherein the empennage comprises a vertical stabilizer and an all-moving horizontal stabilizer, wherein the retractable pogo support and at least two points of the all-moving horizontal stabilizer define the tripod support during the launch operation.

14. A vertical take-off and landing (VTOL) aircraft comprising:
   a fuselage;
   an empennage located at a tail end of the VTOL aircraft, wherein the empennage is configured to engage the ground during a launch operation to define a first ground contact point and a second ground contact point;
   a retractable pogo support to deploy from the fuselage during the launch operation,
      wherein a distal end of the retractable pogo support is configured to engage the ground to define a third ground contact point, and
      wherein the first, second, and third ground contact points define a tripod support to support the fuselage of the VTOL aircraft at a predetermined stand-up angle during the launch operation;
   a wing having a first wing tip and a second wing tip, the fuselage positioned between the first and second wing tips; and
   a first propulsor and a second propulsor, the first propulsor positioned on the wing left of the fuselage and the second propulsor positioned on the wing right of the fuselage.

15. The VTOL aircraft of claim 14, wherein the wing is a fixed wing.

16. The VTOL aircraft of claim 14, wherein the first propulsor and the second propulsor are configured to pivot relative to the fuselage about a transverse axis.

17. The VTOL aircraft of claim 14, wherein the wing is configured to pivot relative to the fuselage about a transverse axis.

18. The VTOL aircraft of claim 14, wherein the first propulsor and the second propulsor counter-rotate relative to one another.

19. The VTOL aircraft of claim 14, wherein the predetermined stand-up angle is between 65 and 75 degrees.

20. A method for launching a vertical take-off and landing (VTOL) aircraft having a propulsor, a fuselage, a retractable pogo support coupled to the fuselage, a wing, and an empennage located at a tail end of the VTOL aircraft, the method comprising:

extending the retractable pogo support from said fuselage until a distal end of the retractable pogo support contacts the ground to define a first ground contact point;

continuing to extend the retractable pogo support from said fuselage until at least two points on the empennage make contact with the ground to define a second ground contact point and a third ground contact point;

continuing to extend the retractable pogo support from said fuselage until the fuselage of the VTOL aircraft is positioned at a predetermined stand-up angle relative to the ground, wherein the VTOL aircraft is supported by a tripod support defined by the first ground contact point, the second ground contact point, and the third ground contact point; and controlling the propulsor to launch the VTOL aircraft.

21. The method of claim 20, wherein the predetermined stand-up angle is between 65 and 75 degrees.

22. The method of claim 20, wherein the wing is a fixed wing having a first wing tip and a second wing tip, the fuselage positioned approximately halfway between the first wing tip and second wing tip.

\* \* \* \* \*